United States Patent
Sunaga et al.

(10) Patent No.: US 10,526,435 B2
(45) Date of Patent: Jan. 7, 2020

(54) METHOD FOR MANUFACTURING HYDROGENATED POLYMER

(71) Applicant: KURARAY CO., LTD., Kurashiki-shi (JP)

(72) Inventors: Syuichi Sunaga, Kamisu (JP); Yasuhiro Nakai, Kamisu (JP); Tomoaki Tsuji, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/321,254

(22) PCT Filed: Jun. 26, 2015

(86) PCT No.: PCT/JP2015/068513
§ 371 (c)(1),
(2) Date: Dec. 22, 2016

(87) PCT Pub. No.: WO2015/199222
PCT Pub. Date: Dec. 30, 2015

(65) Prior Publication Data
US 2017/0204214 A1    Jul. 20, 2017

(30) Foreign Application Priority Data
Jun. 27, 2014   (JP) ................. 2014-132751

(51) Int. Cl.
C08F 8/04        (2006.01)
C08F 257/02   (2006.01)

(52) U.S. Cl.
CPC ................. *C08F 257/02* (2013.01)

(58) Field of Classification Search
CPC ........ C08F 8/04; C08C 19/02; B01J 31/0274; B01J 21/063; B01J 27/135; B01J 31/38
See application file for complete search history.

(56) References Cited

U.S. PATENT DOCUMENTS

| | | | | |
|---|---|---|---|---|
| 5,244,980 A * | 9/1993 | Gibler | ...................... | C08F 8/04 525/332.8 |
| 5,334,566 A | 8/1994 | Gibler et al. | | |
| 5,633,415 A * | 5/1997 | Brandes | ................... | C07C 15/40 526/337 |
| 5,886,108 A * | 3/1999 | Miyamoto | .............. | C08C 19/02 525/332.8 |
| 6,313,230 B1 * | 11/2001 | Tsai | ........................ | C08C 19/02 525/332.8 |
| 2010/0137525 A1 | 6/2010 | Chen et al. | | |
| 2014/0371383 A1 | 12/2014 | Hayata et al. | | |
| 2015/0273458 A1 | 10/2015 | Araki et al. | | |

FOREIGN PATENT DOCUMENTS

| CN | 101829600 A | 9/2010 |
|---|---|---|
| CN | 103764682 | 4/2014 |
| EP | 2 130 842 A1 | 12/2009 |
| JP | 60-220147 A | 11/1985 |
| JP | 9-278677 A | 10/1997 |
| JP | 11-71426 A | 3/1999 |
| JP | 2000-95814 A | 4/2000 |

(Continued)

OTHER PUBLICATIONS

International Search Report dated Sep. 8, 2015 in PCT/JP2015/068513 filed Jun. 26, 2015.
Tebbe, F.N. et al., "Olefin Homologation with Titanium Methylene Compounds," Journal of the American Chemical Society, vol. 100, No. 11, 1978, pp. 3611-3613 (3 pages).
Ott, Kevin C. et al., "An Investigation of the Reaction of Bis(cyclopentadienyl)titanium Dichlorides with Trimethylaluminum. Mechanism of an α-Hydrogen Abstraction Reaction," Organometallics, vol. 3, No. 2, 1984, pp. 223-230 (8 pages).
Thompson, Rick et al., "Structural Elucidation of the Illustrious Tebbe Reagent," Organometallics, vol. 33, 2014, pp. 429-432 (4 pages).
Fan, Yin-Heng et al., "Extremely Active Catalysts for the Hydrogenation of Terminal Alkenes," Journal of Catalysis, vol. 205, 2002, pp. 294-298 (5 pages).

(Continued)

*Primary Examiner* — Robert C Boyle
(74) *Attorney, Agent, or Firm* — Oblon, McClelland, Maier & Neustadt, L.L.P.

(57) ABSTRACT

[Problem]
Provided is a method for producing an industrially advantageous hydrogenated polymer, whereby a high hydrogenation rate can be achieved by a small use amount therein at a level of not requiring a decalcification process of the catalyst.
[Solution]
A method for producing a hydrogenated polymer including hydrogenating, with a hydrogen molecule, a carbon-carbon double bond based on a conjugated diene structural unit of a polymer in which at least a part of a living polymer obtained by polymerizing a monomer containing one or more conjugated dienes using an organic alkali metal compound as a polymerization initiator is terminated by a hydrogen molecule, in the presence of a silane compound having at least one silyl hydride bond and an organic metal compound represented by the following general formula (I):

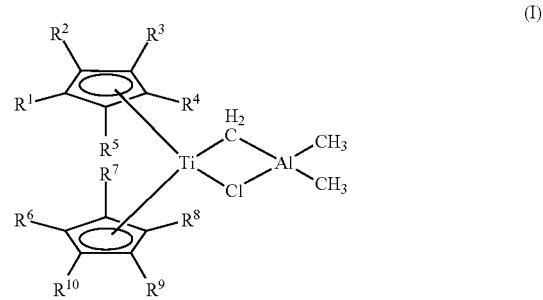

(I)

wherein $R^1$ to $R^{10}$ are those as defined in the specification.

9 Claims, No Drawings

(56) References Cited

FOREIGN PATENT DOCUMENTS

| JP | 2001-153919 A | 6/2001 |
| JP | 2001-270913 A | 10/2001 |
| JP | 2004-211058 A | 7/2004 |
| JP | 2004-269665 A | 9/2004 |

OTHER PUBLICATIONS

Extended European Search Report dated Feb. 2, 2018 in European Patent Application No. 15812172.3, citing documents AA and AO therein, 5 pages.
Office Action dated Jul. 13, 2018, in Chinese patent application No. 201580034291.9 (10 pages).

* cited by examiner

METHOD FOR MANUFACTURING HYDROGENATED POLYMER

TECHNICAL FIELD

The present invention relates to a method for producing a hydrogenated polymer. In detail, the present invention relates to a method for producing a hydrogenated polymer by hydrogenating a carbon-carbon double bond based on a conjugated diene structural unit of a polymer in which at least a part of a living polymer obtained by polymerizing a monomer containing one or more conjugated dienes using an organic alkali metal compound as a polymerization initiator is terminated by a hydrogen molecule.

BACKGROUND ART

In a conjugated diene-based polymer obtained by copolymerizing one or more conjugated dienes or one or more conjugated dienes and a vinyl aromatic compound using an organic alkali metal compound as a polymerization initiator, it is known that its heat resistance, oxidation resistance, weather resistance, or ozone resistance, or the like can be improved by hydrogenating a carbon-carbon double bond based on a conjugated diene structural unit of the polymer, and that a a hydrogenated product of such a conjugated diene-based polymer is industrially useful as elastic bodies or thermoplastic elastomers.

As a hydrogenation catalyst on the occasion of hydrogenating a conjugated diene-based polymer, nickel-based or cobalt-based Ziegler-Natta catalysts and so on have hitherto been suitably used. However, in order to suppress coloration to be caused due to the residues of a component derived from the catalyst in the resulting hydrogenated product, it was necessary to remove the catalyst residues derived from such a Ziegler-Natta catalyst from the hydrogenation reaction liquid by a means, such as extraction, washing, etc., prior to separation and acquisition of the hydrogenated product. Meanwhile, if a titanium-based catalyst, especially a titanocene-based compound that is a metallocene-based compound, is used as a hydrogenation reaction catalyst of a conjugated diene-based polymer, it has higher catalytic activity than the Ziegler-type catalyst, and it is possible to undergo the hydrogenation reaction using a smaller amount of the catalyst. Therefore, an operation of removing the catalyst component from the hydrogenation reaction liquid becomes unnecessary, or even when the operation is performed, a means of removing the catalyst component may become simple and easy. In consequence, a hydrogenation reaction of a conjugated diene-based polymer using a titanocene-based compound as a catalyst is investigated (see PTLs 1 to 11).

Among the titanocene-based compounds, a solution obtained by allowing bis(cyclopentadienyl)titanium dichloride to react with two equivalents of trimethylaluminum in a toluene solvent is called a Tebbe reagent, and μ-chloro-μ-methylene-bis($\eta^5$-cyclopentadienyl)titaniumdimethylaluminum ($Cp_2TiCH_2AlClMe_2$) that is mainly existent is known as a Tebbe complex. In addition, the Tebbe complex can be isolated from the Tebbe reagent through a recrystallization operation (see NPLs 1 to 3). It is known that a Tebbe-type metallacycle compound represented by the Tebbe complex is useful as a hydrogenation catalyst of a carbon-carbon double bond based on a conjugated diene structural unit of a conjugated diene-based polymer (see PTLs 2 to 3 and 6 to 8).

More specifically, PTLs 2 and 3 disclose a method in which at least one conjugated diene is polymerized or copolymerized using an organic alkali metal compound as a polymerization initiator in the presence of a solvent and then allowed to act on hydrogen to terminate the polymerization, and the resulting conjugated diene-based polymer is allowed to react with hydrogen in the presence of an accelerator that is the organic alkali metal compound and a Tebbe complex, thereby selectively hydrogenating an unsaturated double bond in the conjugated diene structural unit, and describe that in order to achieve a hydrogenation degree of 95% or more, a ratio of the alkali metal atom to the titanium atom is at least 2 or more, and preferably 5 to 15. In addition, in the case where the solution of the conjugated diene-based polymer is high in viscosity (the conjugated diene-based polymer has a high molecular weight), it is necessary to increase the ratio of the alkali metal atom to the titanium atom. It is disclosed that if an alkali metal hydride must be added in order to increase this ratio, after adding the organic alkali metal compound in the system of before and after the polymerization termination reaction, by allowing the resultant to act on hydrogen dispersed by spargers, the alkali metal hydride can be prepared within the system.

PTLs 4 and 5 disclose the hydrogenation reaction using a titanocene compound that is different from the Tebbe-type metallacycle compound and making lithium hydride coexistent.

In detail, PTL 4 discloses a method in which (1) at least one conjugated diene is homopolymerized or copolymerized using an organic lithium compound as an initiator to prepare a living polymer; (2) the formed living polymer is end-terminated using an equimolar amount of an end-modifying material; and (3) a specified monocyclopentadienyl titanium compound and lithium hydride as prepared from an organic lithium compound and hydrogen are added to the aforementioned end-terminated polymer individually or in a mixed form by premixing outside, and the conjugated diene-containing polymer is then selectively hydrogenated.

PTL 5 discloses a method for hydrogenation of a conjugated diene polymer, the process including the steps of (a) polymerizing or copolymerizing at least one conjugated diene in a hydrocarbon solvent using an organic alkali metal polymerization initiator to form a living polymer; (b) adding one or more end-modifying agent selected from the group consisting of amines, alcohols, esters, ketones, and halogen compounds to deactivate an active terminal of the living polymer to form a conjugated diene polymer; and (c) selectively hydrogenating an unsaturated double bond of a conjugated diene unit of the conjugated diene polymer using a specified cyclopentadienyltitanium compound and a highly active lithium hydride obtained by precisely controlling a particle diameter by a reactor equipped with a high-speed injection nozzle.

NPL 4 reports that in the hydrogenation reaction of a terminal alkene, such as 1-hexene, etc., with a titanocene compound using sodium hydride as a cocatalyst, the prepared sodium hydride of a nanometer size (specific surface area: 90 $m^2/g$) exhibited high hydrogenation activity; however, in the case of using commercially available sodium hydride (specific surface area: 1.4 $m^2/g$), the hydrogenation reaction does not proceed at all.

PTL 6 discloses a hydrogenation method of a conjugated diene polymer, in which on the occasion of adding a deactivating agent (the molar amount of the deactivating agent is defined as Z) to a conjugated diene polymer obtained through polymerization with, as a polymerization initiator, an organic alkali metal compound (the molar amount of the alkali metal compound contained is defined as M) to achieve deactivation and bringing the resultant into contact with hydrogen in an inert hydrocarbon solvent to hydrogenate a double bond of the conjugated diene unit, the hydrogenation is performed in the presence of an organic titanium compound that is a Tebbe-type metallacycle compound (the molar amount of the organic titanium compound is defined as Ti, and the molar amount of an organic aluminum compound is defined as Al) within a range of ($-6 \leq (M-Z+Al-Ti)/Ti \leq +2$). Here, Ti is corresponding to a total molar amount of an unreacted material of the organic titanium compound that is a synthetic raw material of the Tebbe-type metallacycle compound, the Tebbe-type metallacycle compound, and by-produced other organic titanium compounds, and Al is corresponding to a total molar amount of an unreacted material of the organic aluminum compound that is a synthetic raw material of the Tebbe-type metallacycle compound, aluminum existent in the Tebbe-type metallacycle compound, and aluminum in by-produced other organic titanium compounds.

PTL 7 discloses a hydrogenation method of a conjugated diene-based polymer, in which on the occasion of hydrogenating a conjugated diene-based polymer obtained through polymerization with an organic alkali metal compound as a polymerization initiator by using a metallocene-based hydrogenation catalyst to obtain a conjugated diene-based polymer having a hydrogenation rate of 98% or more, the hydrogenation catalyst is added dividedly two or more times, and preferably, at the point of time when the hydrogenation rate reaches 60% to 95%, the hydrogenation catalyst is added one or more times, thereby advancing the hydrogenation. In addition, it is also disclosed that the timing of addition of the hydrogenation catalyst is determined by measuring an absorption rate of hydrogen (see PTL 8). Here, as an example of the metallocene-based hydrogenation catalyst, a Tebbe-type metallacycle compound is exemplified.

PTL 9 discloses a catalyst composition composed of at least one compound among an oxygen-containing organic compound or nitrogen-containing organic compound having two or more carbon atoms and a salt thereof, and a Tebbe-type metallacycle compound and discloses that when an olefinic unsaturated double bond of an olefin compound, particularly a conjugated diene-based polymer is hydrogenated using the foregoing catalyst composition, even if an alkyl alkali metal compound as a cocatalyst is not used, sufficient hydrogenation catalytic activity is exhibited in a use amount at a level of not requiring decalcification, and excellent heat resistance of the catalyst is revealed. It is also disclosed that by properly further combining specified other organic metallic compounds, the long-term storage stability is improved, thereby enabling the activity stability to be kept over a long period of time.

In addition, PTLs 10 and 11 disclose the hydrogenation reaction of a conjugated diene-based polymer having high hydrogenation activity and excellent stability of catalyst (heat resistance and storage stability) in the presence of a titanocene compound that is different from a Tebbe-type metallacycle compound, a specified silyl hydride compound, and, as a third component, an alkali metal hydride, an alkali metal alkoxide, an organic aluminum compound, an organic magnesium compound, an organic zinc compound, an organic titanium compound other than a titanocene compound, or the like.

CITATION LIST

Patent Literature

PTL 1: JP 60-220147 A
PTL 2: U.S. Pat. No. 5,244,980 A
PTL 3: U.S. Pat. No. 5,334,566 A
PTL 4: JP 2001-163919 A
PTL 5: JP 2004-211058 A
PTL 6: JP 11-71426 A
PTL 7: JP 2000-95814 A
PTL 8: JP 2001-270913 A
PTL 9: JP 09-278677 A
PTL 10: U.S. Pat. No. 6,313,230 A
PTL 11: US 2010/0137525 A

Non-Patent Literature

NPL 1: *Journal of the American Chemical Society*, Vol. 100, No. 11, 1978, pp. 3611-3613
NPL 2: *Organometallics*, Vol. 3, No. 2, 1984, pp. 223-230
NPL 3: *Organometallics*, Vol. 33, 2014, pp. 429-432
NPL 4: *Journal of Catalysis*, Vol. 205, 2002, pp. 294-298

SUMMARY OF INVENTION

Technical Problem

According to NPL 4, the hydrogenation catalytic activity of the titanocene compound depends on the specific surface area of sodium hydride to be added. According to PTLs 4 to 5, from the viewpoint of enhancing the hydrogenation reaction catalyst activity of the titanocene compound, it is effective to produce the alkali metal hydride as the cocatalyst (reducing agent) within the system, preferably by a specified method, and for example, it is necessary to allow gaseous hydrogen supplied through the high-speed injection nozzle to act on an alkyl lithium. In the solution containing the conjugated diene-based polymer, not only the solution viscosity varies with the molecular weight of the polymer or the temperature of the hydrogenation reaction, so that equipment for thoroughly diffusing the gaseous hydrogen is necessary separately, but also it is actually difficult to control the specific surface area, etc. of the produced alkali metal hydride and to grasp it, so that there is involved such a problem that the hydrogenation catalytic activity is readily variable.

The method disclosed in PTL 6 does not require the alkali metal compound as the cocatalyst and prescribes the range of "($-6 \leq (M-Z+Al-Ti)/Ti \leq +2$)"; however, in order to satisfy such a prescription, the addition of the deactivating agent (Z) is essential. Besides, there is involved such a problem that the titanium concentration in the actual hydrogenation reaction system is in a level of several 10 ppm.

According to the methods of PTLs 7 to 8, in order to achieve the high hydrogenation rate, the total addition amount of the metallocene-based catalyst to be added dividedly becomes high as 25 ppm to 70 ppm.

According to the method of PTL 9, it is pointed out in PTL 6 that the oxygen-containing organic compound or nitrogen-containing organic compound having two or more carbon atoms, which is used together with the Tebbe-type metallacycle compound, may possibly reversely result in a lowering of the hydrogenation catalytic activity depending upon the use amount thereof.

In consequence, on the occasion of using the Tebbe-type metallacycle compound as the hydrogenation catalyst and selectively hydrogenating the carbon-carbon double bond based on the conjugated diene structural unit of the conjugated diene-based polymer to produce a hydrogenated polymer, an extremely highly active hydrogenation catalyst system capable of achieving a hydrogenation rate of 95% or more by a small use amount therein at a level of not requiring a decalcification process of the catalyst is still demanded.

Solution to Problem

According to investigations made by the present inventors, the aforementioned problem is solved by providing the following [1] to [10]

[1] A method for producing a hydrogenated polymer, including hydrogenating, with a hydrogen molecule, a carbon-carbon double bond based on a conjugated diene structural unit of a polymer in which at least a part of a living polymer obtained by polymerizing a monomer containing one or more conjugated dienes using an organic alkali metal compound as a polymerization initiator is terminated by a hydrogen molecule, in the presence of a silane compound having at least one silyl hydride bond and an organic metal compound represented by the following general formula (I) (hereinafter referred to as "organic metal compound (I)"):

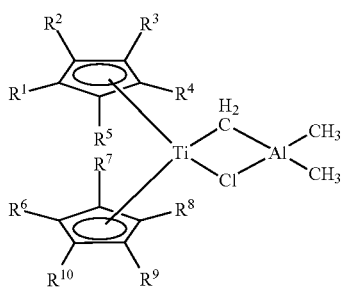

(I)

wherein $R^1$ to $R^{10}$ each independently represent a hydrogen atom, a hydrocarbon group having 1 to 12 carbon atoms, or a trialkylsilyl group having an alkyl group having 1 to 12 carbon atoms, provided that arbitrary adjacent two among $R^1$ to $R^5$ may form a ring; arbitrary adjacent two among $R^6$ to $R^{10}$ may form a ring; and one among $R^1$ to $R^5$ and one among $R^6$ to $R^{10}$ may have a structure mutually crosslinked directly or via a divalent organic group.

[2] The method for producing a hydrogenated polymer of the item [1], wherein the silane compound having at least one silyl hydride bond (hereinafter sometimes referred to as "silane compound (II)") is at least one selected from a silyl hydride compound represented by the following general formula (II-1), a silyl hydride polymer compound represented by the following general formula (II-2), a cyclic silyl hydride compound represented by the following general formula (II-3), and a silazane compound represented by the following general formula (II-4):

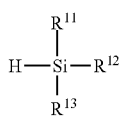

(II-1)

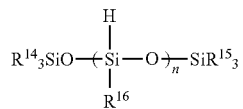

(II-2)

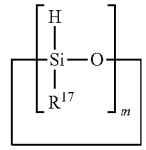

(II-3)

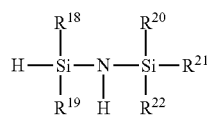

(II-4)

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ each independently represent a hydrogen atom, a halogen atom, an alkyl group, an aryl group, an aralkyl group, a cycloalkyl group, an alkoxy group, an aryloxy group, an aralkyloxy group, an acyloxy group, or a carboxyl group; n represents a positive integer of 0 or more; and m represents an integer of 2 to 5.

[3] The method for producing a hydrogenated polymer of the item [2], wherein the silane compound (II) includes at least one selected from the group consisting of methyldichlorosilane, ethyldichlorosilane, propyldichlorosilane, butyldichlorosilane, pentyldichlorosilane, hexyldichlorosilane, heptyldichlorosilane, octyldichlorosilane, nonyldichlorosilane, decyldichlorosilane, phenyldichlorosilane, dimethylchlorosilane, diethylchlorosilane, dipropylchlorosilane, dibutylchlorosilane, dipentylchlorosilane, dihexylchlorosilane, diheptylchlorosilane, dioctylchlorosilane, dinonylchlorosilane, didecylchlorosilane, methylpropylchlorosilane, methylhexylchlorosilane, methylphenylchlorosilane, polymethylhydrosiloxane, polyethylhydrosiloxane, polypropylhydrosiloxane, polybutylhydrosiloxane, polypentylhydrosiloxane, polyhexylhydrosiloxane, polyheptylhydrosiloxane, polyoctylhydrosiloxane, polynonylhydrosiloxane, polydecylhydrosiloxane, polyphenylhydrosiloxane, 1,1,3,3-tetramethyldisiloxane, 1,1,3,3-tetraethyldisiloxane, 1,1,3,3-tetramethyldisilazane, 1,1,3,3-tetraethyldisilazane, 1,1,3,3-tetrapropyldisilazane, 1,1,3,3-tetrabutyldisilazane, and 1,1,3,3-tetraphenyldisilazane.

[4] The method for producing a hydrogenated polymer of any one of the items [1] to [3], wherein the living polymer is any one of S—B—Li, S—B—S—Li, S—B—S—B—Li, B—S—Li, B—S—B—Li, and B—S—B—S—Li, each having a conjugated diene block B constituted of one or more conjugated dienes and a vinyl aromatic compound block S constituted of one or more vinyl aromatic compounds; a block copolymer in which at least a part of the living polymer is terminated by a hydrogen molecule has a weight average molecular weight of 5,000 to 1,000,000 and a molecular weight distribution of 1.00 to 3.00 as expressed in terms of standard polystyrene measured by gel permeation chromatography; and a content of the structural unit derived from the conjugated diene in the polymer is 10 to 90% by mass.

[5] The method for producing a hydrogenated polymer of the item [4], wherein the conjugated diene block B of the living polymer contains at least one of butadiene or isoprene, and the vinyl aromatic compound block S contains at least styrene; a polymer in which at least a part of the living polymer is terminated by a hydrogen molecule has a weight average molecular weight of 50,000 to 500,000 and a molecular weight distribution of 1.00 to 1.25 as expressed in terms of standard polystyrene measured by gel permeation chromatography; and a content of the structural unit derived from the conjugated diene in the polymer is 30 to 70% by mass.

[6] The method for producing a hydrogenated polymer of the item [4] or [5], wherein the conjugated diene block B is constituted of butadiene, isoprene, or a mixture thereof, and the vinyl aromatic compound block S is constituted of styrene.

[7] The method for producing a hydrogenated polymer of any one of the items [1] to [6], wherein the use amount of the organic metal compound (I) is in the range of from $1.0 \times 10^{-4}$ to $1.0 \times 10^{-1}$ mmol in terms of a titanium atom of the organic metal compound (I) per 1 mol of the carbon-carbon double bond based on the conjugated diene structural unit contained in the polymer; and the use amount of the silane compound (II) is 1 mol or more in terms of a molar number of the silicon atom constituting the silyl hydride bond per 1 mol of a titanium atom of the organic metal compound (I).

[8] The method for producing a hydrogenated polymer of the item [7], wherein the use amount of the organic metal compound (I) is in the range of from $1.0 \times 10^{-3}$ to $1.0 \times 10^{-2}$ mmol in terms of a titanium atom of the organic metal compound (I) per 1 mol of the carbon-carbon double bond based on the conjugated diene structural unit contained in the polymer; and the use amount of the silane compound (II) is in the range of from 1 to 500 mol in terms of a molar number of the silicon atom constituting the silyl hydride bond per 1 mol of a titanium atom of the organic metal compound (I).

[9] The method for producing a hydrogenated polymer of any one of the items [1] to [8], including allowing a titanocene dichloride represented by the following general formula (III) (hereinafter referred to as "titanocene dichloride (III)"):

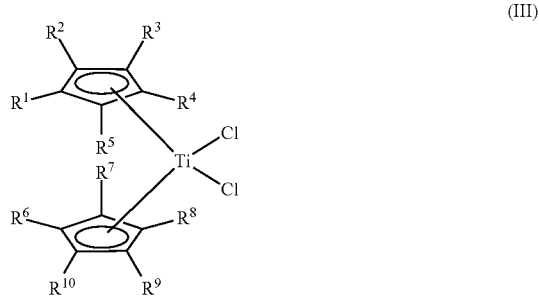

(III)

wherein $R^1$ to $R^{10}$ are those as defined above, to react with trimethylaluminum in an organic solvent to produce the organic metal compound (I) and using the organic metal compound (I).

[10] The method for producing a hydrogenated polymer of the item [9], wherein the titanocene dichloride (III) is at least one selected from the group consisting of bis(cyclopentadienyl)titanium dichloride, bis(ethylcyclopentadienyl)titanium dichloride, bis(tert-cyclopentadienyl)titanium dichloride, bis(pentamethylcyclopentadienyl)titanium dichloride, dichlorobis(fluorenyl)titanium, and dichlorobis(indenyl)titanium.

Advantageous Effects of Invention

In accordance with the present invention, in view of the fact that on the occasion of using the Tebbe-type metallacycle compound as the hydrogenation catalyst and selectively hydrogenating the carbon-carbon double bond based on the conjugated diene structural unit of the conjugated diene-based polymer to produce a hydrogenated polymer, a high hydrogenation rate can be achieved by a small use amount therein at a level of not requiring a decalcification process of the catalyst, a hydrogenated polymer can be industrially advantageously produced. The hydrogenation catalyst system that is used in the production method of the present invention is extremely high in activity.

DESCRIPTION OF EMBODIMENTS

The polymer to which the production method of the present invention is applicable is a polymer in which at least a part of a living polymer obtained by polymerizing a monomer containing one or more conjugated dienes using an organic alkali metal compound as a polymerization initiator is terminated by a hydrogen molecule. In the production method of the present invention, the hydrogenated polymer is obtained by selectively hydrogenating a carbon-carbon double bond based on a conjugated diene structural unit contained in such a polymer.

Examples of the organic alkali metal compound that is used for the polymerization initiator include organic lithium compounds, such as methyllithium, ethyllithium, propyllithium, isopropyllithium, butyllithium, sec-butyllithium, tert-butyllithium, isobutyllithium, pentyllithium, hexyllithium, butadienyllithium, chclohexyllithium, phenyllithium, benzyllithium, p-toluyllithium, styryllithium, trimethylsilyllithium, 1,4-dilithiobutane, 1,5-dilithiopentane, 1,6-dilithiohexane, 1,10-dilithiodecane, 1,1-dilithiodiphenylene, dilithiop olybutadiene, dilithiopolyisop rene, 1,4-dilithiobenzene, 1,2-dilithio-1,2-diphenylethane, 1,4-dilithio-2-ethylcylohexane, 1,3,5-trilithiobenzene, 1,3,5-trilithio-2,4,6-triethylbenzene, etc.; organic sodium compounds, such as methylsodium, ethylsodium, n-propylsodium, isopropylsodium, n-butylsodium, sec-butylsodium, tert-butylsodium, isobutylsodium, phenylsodium, sodium naphthalene, cyclopentadienylsodium, etc.; and the like. Of these organic alkali metal compounds, n-butyllithium and sec-butyllithium are preferred. The organic alkali metal compound may be used solely or may be used in combination of two or more thereof. The use amount of the organic alkali metal compound can be properly set in conformity with a weight average molecular weight of the desired living polymer or a concentration of the living polymer in a living polymer solution.

Examples of the conjugated diene include conjugated dienes having 4 to 15 carbon atoms, such as butadiene, isoprene, 2,3-dimethyl-1,3-butadiene, 1,3-pentadiene, 2-methyl-1,3-pentadiene, 3-methyl-1,3-pentadiene, 1,3-hexadiene, 4,5-diethyl-1,3-butadiene, phenyl-1,3-butadiene, 4,5-diethyl-1,3-octadiene, 3-butyl-1,3-octadiene, 1,3-cyclohexadiene, 1,3,7-octatriene, myrcene (7-methyl-3-methyleneocta-1,6-diene), farnesene (3,7,11-trimethyl-1,3,6,10-dodecatetraene), etc. However, the conjugated diene is not limited thereto. Such a conjugated diene may be used solely or may be used in combination of two or more thereof. The conjugated diene preferably includes butadiene or isoprene, and is more preferably butadiene, isoprene, or a mixture of butadiene and isoprene.

The polymer to which the present invention is applicable is not particularly limited so long as it has a structural unit composed of one or more conjugated dienes. That is, the polymer may be a homopolymer of one conjugated diene or may be a copolymer of two or more conjugated dienes, and the polymer can also be a copolymer of one or more conjugated dienes and other monomer that is polymerizable using the organic alkali metal compound as a polymerization initiator. The copolymer is not particularly limited with respect to its bonding mode and may be any of a random copolymer, a block copolymer, a block copolymer having a tapered structure, a star copolymer, and so on.

Examples of other monomer that is polymerizable using the organic alkali metal compound as a polymerization initiator include vinyl aromatic compounds and the like. Examples of such a vinyl aromatic compound include styrene, α-methylstyrene, α-methyl-4-methylstyrene, 2-methylstyrene, 3-methylstyrene, 4-methylstyrene, 2,4-dimethylstyrene, 2,5-dimethylstyrerne, 3,4-dimethylstyrene, 3,5-dimethylstyrene, 2-ethylstyrene, 3-ethylstyrene, 4-ethylstyrene, 4-n-propylstyrerne, 4-isopropylstyrene, 4-tert-butylstyrerne, 4-cyclohexylstyrene, 4-dodecylstyrene, 2-ethyl-4-benzylsytrene, 4-(4-phenyl-n-butyl)styrene, 1-vinylnaphthalene, 2-vinylnaphthalene, 1,1-diphenylethylene, N,N-dimethyl-p-aminoethylstyrene, N,N-diethyl-p-aminoethylstyrene, 1,2-divinylbenzene, 1,3-divinylbenzene, 1,4-divinylbenzene, 1,2-divinyl-3,4-dimethylbenzene, 2,4-divinylbiphenyl, 1,3-divinylnaphthalene, 1,2,4-trivinylbenzene, 3,5,4'-trivinylbiphenyl, 1,3,5-trivinylnaphthalene, 1,5,6-trivinyl-3,7-diethylnaphthalene, and the like. Of these vinyl aromatic compounds, styrene is especially preferred. Such a vinyl aromatic compound may be used solely or may be used in combination of two or more thereof.

In the production method of the present invention, it is preferred to use a polymer in which at least a part of a living polymer obtained through polymerization using the organic lithium compound as the organic alkali metal compound is terminated by a hydrogen molecule. The living polymer is more preferably a block copolymer that is any one of S—B—Li, S—B—S—Li, S—B—S—B—Li, B—S—Li, B—S—B—Li, and B—S—B—S—Li, each having a conjugated diene block B constituted of one or more conjugated dienes and a vinyl aromatic compound block S constituted of one or more vinyl aromatic compounds, at least a part of the living polymer being terminated by a hydrogen molecule.

The conjugated diene block B more preferably contains, as a structural unit, at least one of butadiene or isoprene and is still more preferably constituted of butadiene, isoprene, or a mixture thereof. The vinyl aromatic compound block S more preferably contains, as the structural unit, styrene and is still more preferably constituted of styrene.

In the present specification, the "conjugated diene block B" means one in which a content of the structural unit based on the conjugated diene is 50% by mass or more, and the "vinyl aromatic compound block S" means one in which a content of the structural unit based on the vinyl aromatic compound is 50% by mass or more. That is, the conjugated diene block B may contain a structural unit based on other monomer than the conjugated diene, and the vinyl aromatic compound block S may contain a structural unit based on other monomer than the vinyl aromatic compound. The structural unit in each of the blocks is not particularly limited with respect to its bonding mode.

In the polymer in which at least a part of the living polymer obtained by polymerizing a monomer containing one or more conjugated dienes using an organic alkali metal compound as a polymerization initiator is terminated by a hydrogen molecule, its weight average molecular weight as expressed in terms of standard polystyrene measured by gel permeation chromatography is preferably 5,000 to 1,000,000, and more preferably 50,000 to 500,000. Its molecular weight distribution is preferably 1.00 to 3.00, and more preferably 1.00 to 1.25. Furthermore, a content of the structural unit derived from the conjugated diene in the polymer is preferably 10 to 90% by mass, and more preferably 30 to 70% by mass.

In order to control the bonding mode of the conjugated diene in the polymer (a 1,2-bond unit and a 1,4-bond unit in the case of butadiene; and a 1,2-bond unit, a 3,4-bond unit, and a 1,4-bond unit in the case of isoprene), a Lewis base can be made coexistent on the occasion of polymerization.

Examples of such a Lewis base include acyclic monoethers, such as dimethyl ether, methyl ethyl ether, diethyl ether, ethyl propyl ether, dipropyl ether, butyl methyl ether, tert-butyl methyl ether, dibutyl ether, dioctyl ether, ethyl phenyl ether, diphenyl ether, etc.; acyclic diethers, such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, etc.; cyclic ethers, such as tetrahydrofuran, tetrahydropyran, 1,4-dioxane, etc.; acyclic polyethers, such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether, tetrabutylene glycol diethyl ether, etc.;

tertiary monoamines, such as trimethylamine, triethylamine, tripropylamine, triisopropylamine, tributylamine, triisobutylamine, tri-sec-butylamine, tri-tert-butylamine, tripentylamine, triisopentylamine, trineopentylamine, trihexylamine, triheptylamine, trioctylamine, triphenylamine, tribenzylamine, N,N-dimethylethylamine, N,N-dimethylpropylamine, N,N-dimethylisopropylamine, N,N-dimethylbutylamine, N,N-dimethylisobutylamine, N,N-dimethyl-sec-butylamine, N,N-dimethyl-tert-butylamine, N,N-dimethylpentylamine, N,N-dimethylisopentylamine, N,N-dimethylneopentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-dimethylphenylamine, N,N-dimethylbenzylamine, N,N-diethylmonomethylamine, N,N-dipropylmonomethylamine, N,N-diisopropylmonomethylamine, N,N-dibutylmonomethylamine, N,N-diisobutylmonomethylamine, N,N-di-sec-butylmonomethylamine, N,N-di-tert-butylmonomethylamine, N,N-dipentylmonomethylamine, N,N-diisopentylmonomethylamine, N,N-dineopentylmonomethylamine, N,N-dihexylmonomethylamine, N,N-diheptylmonomethylamine, N,N-dioctylmonomethylamine, N,N-dinonylmonomethylamine, N,N-didecylmonomethylamine, N,N-diundecylmonomethylamine, N,N-didodecylmonomethylamine, N,N-diphenylmonomethylamine, N,N-dibenzylmonomethylamine, N,N-dipropylmonomethylamine, N,N-diisopropylmonoethylamine, N,N-dibutylmonoethylamine, N,N-diisobutylmonoethylamine, N,N-di-sec-butylmonoethylamine, N,N-di-tert-butylmonoethylamine, N,N-dipentylmonoethylamine, N,N-diisopentylmonoethylamine, N,N-dineopentylmonoethylamine, N,N-dihexylmonoethylamine, N,N-diheptylmonoethylamine, N,N-dioctylmonoethylamine, N,N-dinonylmonoethylamine, N,N-didecylmonoethylaamine, N,N-diundecylmonoethylamine, N,N-didodecylmonoethylamine, N,N-diphenylmonoethylamine, N,N-dibenzylmonoethylamine, N,N-dimethylaniline, N,N-diethylaniline, N-ethylpiperazine, N-methyl-N-ethylaniline, N-methylmorpholine, etc.; polyamines, such as N,N,N',N'-tetramethylethylenediamine, N,N,N',N'-tetraethylethylenediamine, N,N,N,N'',N''-pentamethyldiethylenetriamine, tris[2-(dimethylamino)ethyl]amine, etc.; and the like. Of these Lewis bases, tetrahydrofuran and N,N,N',N'-tetramethylethylenediamine are especially preferred. Such a Lewis base may be used solely or may be used in combination of two or more thereof. The use amount of the Lewis base is not particularly limited and can be properly set according to the desire.

The method of producing a polymer, which is adopted in the present invention, is not particularly limited and may be any of a batch method, a semi-batch method, and a continuous method. The form of a reactor is not particularly limited, and a complete mixing tank-type reactor, a tubular reactor, and the like can be adopted. Two or more thereof may be connected in series or parallel to each other and used.

It is preferred to perform the production of a polymer in the presence of a solvent. The solvent is preferably a hydrocarbon from which water, a hydroxy compound, such as an alcohol, etc., a ketone, or the like, that deactivates the polymerization initiator, has been removed. Examples thereof include saturated aliphatic hydrocarbons, such as butane, isobutane, pentane, isopentane, 2,2,4-trimethylpentane, hexane, heptane, isoheptane, octane, isooctane, nonane, decane, cyclopentane, cyclohexane, methylcyclohexane, ethylcyclohexane, cycloheptane, methylcycloheptane, etc.; and aromatic hydrocarbons, such as benzene, toluene, ethylbenzene, propylbenzene, butylbenzene, o-xylene, m-xylene, p-xylene, etc. Of these solvents, cyclohexane and n-hexane are especially preferred. The solvent may be used solely or may be used in combination of two or more thereof. The use amount of the solvent is not particularly limited and can be properly set taking into consideration operability, such as a viscosity of the reaction liquid, etc.

It is preferred to perform the production of a polymer in an inert gas atmosphere, such as nitrogen, argon, helium, etc. As for a specific example of the operation, a hydrocarbon solvent and an organic alkali metal compound are charged into a reactor purged with an inert gas, the temperature is raised to a prescribed temperature, and the conjugated diene and other monomer (preferably a vinyl aromatic compound) are properly added to undergo the polymerization reaction, thereby producing a living polymer. Here, for example, in the case where one kind of a conjugated diene solely is added, a living homopolymer of the conjugated diene; in the case where two or more kinds of conjugated dienes are mixed and added, a living random copolymer of the two or more conjugated dienes; in the case where two or more kinds of conjugated dienes are successively added at every kind of each monomer, a living block copolymer of the two or more conjugated dienes; in the case where a conjugated diene and other monomer (preferably a vinyl aromatic compound) are mixed and added, a living random copolymer of the conjugated diene and the vinyl aromatic compound; and in the case where a conjugated diene and other monomer (preferably a vinyl aromatic compound) are successively added at every kind of each monomer, a living block copolymer of the conjugated diene and the vinyl aromatic compound can be produced, respectively. The Lewis base for controlling the bonding mode of the conjugated diene may be added at the same time with the addition of the conjugated diene and other monomer (preferably a vinyl aromatic compound), or may be charged into the reactor in advance.

In the polymerization reaction, though a concentration of the living polymer formed from the conjugated diene and other monomer (preferably a vinyl aromatic compound) is not particularly limited, in general, it is in the range of from 1 to 50% by mass. In general, a polymerization temperature in the polymerization reaction can be preferably chosen within the range of from −20 to 250° C. that is a solidification point of the solvent or higher and a thermal decomposition temperature of the polymer or lower and is preferably in the range of from 30 to 150° C.

At least a part of the living polymer as obtained above is terminated by a hydrogen molecule, thereby obtaining a polymer that is used in the present invention. The polymer may be obtained by allowing a polymerization terminator that may also have a function as an end-modifying agent as mentioned later in an amount of less than an equivalent amount to act on the active living end of the living polymer and then allowing the hydrogen molecule to act, or the polymer may be obtained by allowing the hydrogen molecule in a large excessive amount to act on the active living end of the living polymer. Especially, the use of a polymer obtained by allowing the hydrogen molecule in a large excessive amount to act directly on the active living end of the living polymer and terminating the polymerization is preferred because the use amount of the organic metal compound (I) that is used in the production method of the present invention can be more decreased.

As the hydrogen molecule, a hydrogen gas can be used. A pressure of the hydrogen gas is not particularly limited, and in general, it can be chosen within the range of from 0 (atmosphere pressure) to 20 MPaG in terms of a gauge pressure, and is preferably in the range of from 0.5 to 10 MPaG.

The operation of terminating at least a part of the living polymer by a hydrogen molecule may be suitably performed by subsequent to the production of the living polymer, supplying a hydrogen gas into the same reactor. In the case of storing a solution containing the living polymer, the termination operation can be performed by supplying a hydrogen gas into a storage tank in which the solution is stored; can also be performed by supplying a hydrogen gas on the occasion of transporting the solution into a hydrogenation reactor; and can also be performed by charging the solution in a hydrogenation reactor and then supplying a hydrogen gas.

A suitable temperature on the occasion of terminating by a hydrogen molecule is within the same range on the occasion of producing the living polymer. An operation time of terminating at least a part of the living polymer by a hydrogen molecule can be chosen within the range of from 5 minutes to 10 days and is preferably in the range of from 15 minutes to 2 hours.

Examples of the polymerization terminator that may also have a function as an end-modifying agent of the living polymer include water; alcohols, such as methanol, ethanol, propanol, isopropanol, butanol, heptanol, cyclohexanol, phenol, benzyl alcohol, o-cresol, m-cresol, p-cresol, ethylene glycol, propylene glycol, butanediol, glycerin, catechol, etc.; halides, such as methyl chloride, methyl bromide, methyl iodide, ethyl chloride, ethyl bromide, ethyl iodide, butyl chloride, butyl bromide, butyl iodide, benzyl chloride, benzyl bromide, benzyl iodide, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilyl fluoride, triphenylsilyl chloride, triphenylsilyl bromide, triphenylsilyl iodide, etc.; ketones, such as 2-heptanone, 4-methyl-2-pentanone, cyclopentanone, 2-hexanone, 2-pentanone, cyclohexanone, 3-pentanone, acetophenone, 2-butanone, acetone, etc.; esters, such as methyl acetate, ethyl acetate, butyl acetate, etc.; epoxy compounds, such as ethylene oxide, propylene oxide, etc.; and the like.

In the method of the present invention, on the occasion of hydrogenating the aforementioned polymer using the hydrogen molecule and the organic metal compound (I), by making the silane compound (II) coexistent, even if the use amount of the organic metal compound (I) is smaller, it becomes possible to drive the hydrogenation reaction, and the hydrogenated polymer in which a content of the catalyst residue is extremely small is obtained.

The organic metal compound (I) that is used for the production method of the present invention is a Tebbe-type metallacycle compound represented by the following general formula (I).

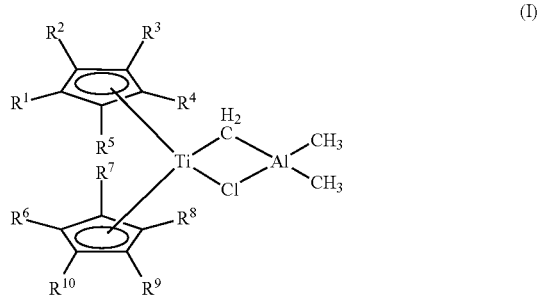

(I)

In the formula, $R^1$ to $R^{10}$ are those as defined above.

Although the production method of the organic metal compound (I) is not particularly limited, suitably, for example, the organic metal compound (I) can be produced by allowing the titanocene dichloride (III) represented by the general formula (III):

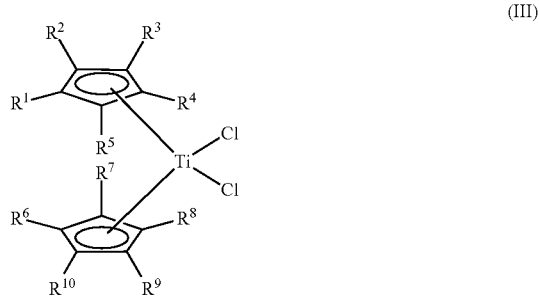

(III)

wherein $R^1$ to $R^{10}$ are those as defined above, to react with trimethylaluminum in the presence of an organic solvent.

Examples of the hydrocarbon group which $R^1$ to $R^{10}$ each independently represent in the organic metal compound (I) and the titanocene dichloride (III) include alkyl groups which may optionally have a hetero atom, such as a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a methoxy group, an ethoxy group, a propoxy group, an isopropoxy group, a butoxy group, an isobutoxy group, a sec-butoxy group, a tert-butoxy group, etc.; and examples of the trialkylsilyl group having an alkyl group having 1 to 12 carbon atoms include a trimethylsilyl group, a triethylsilyl group, and the like.

Examples of the ring which arbitrary adjacent two among $R^1$ to $R^5$ may form and the ring which arbitrary adjacent two among $R^6$ to $R^{10}$ may form include an indenyl group, a fluorenyl group, and the like. Examples of the crosslinked structure which one among $R^1$ to $R^5$ and one among $R^6$ to $R^{10}$ mutually have directly or via a divalent organic group include a methylene group, an ethylidene group, a 1-methylethylidene group, an ethylene group, a dimethylsilylene group, a diethylsilylene group, and the like.

From the viewpoint of easiness of availability, preferred examples of the titanocene dichloride (III) include bis(cyclopentadienyl)titanium dichloride, bis(ethylcyclopentadienyl)titanium dichloride, bis(tert-cyclopentadienyl)titanium dichloride, bis(pentamethylcyclopentadienyl)titanium dichloride, dichlorobis(fluorenyl)titanium, dichlorobis(indenyl)titanium, and the like. Of these, from the standpoint of economy, bis(cyclopentadienyl)titanium dichloride is more preferred, and by allowing it to react with trimethylaluminum, μ-chloro-μ-methylene-bis(cyclopentadienyl)titanium dimethylaluminum (Tebbe complex) is obtained as the organic metal compound (I). It is preferred to use this for the hydrogenation reaction in the production method of the present invention.

The organic solvent that is used on the occasion of allowing the titanocene dichloride (III) to react with trimethylaluminum is not particularly limited so long as it is inert to the reaction. Examples thereof include saturated aliphatic hydrocarbons, such as butane, isobutane, n-pentane, isopentane, 2,2,4-trimethylpentane, hexane, n-heptane, isoheptane, n-octane, isooctane, nonane, decane, etc.; alicyclic hydrocarbons, such as cyclopentane, cyclohexane, methylcyclohexane, ethylcyclohexane, cycloheptane, methylcycloheptane, etc.; aromatic hydrocarbons, such as benzene, toluene, ethylbenzene, propylbenzene, butylbenzene, o-xylene, m-xylene, p-xylene, etc.; acyclic monoethers, such as dimethyl ether, methyl ethyl ether, diethyl ether, ethyl n-propyl ether, di-n-propyl ether, n-butyl methyl ether, tert-butyl methyl ether, di-n-butyl ether, di-n-octyl ether, ethyl phenyl ether, diphenyl ether, etc.; acyclic diethers, such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, cyclopentyl methyl ether, etc.; cyclic ethers, such as tetrahydrofuran, tetrahydropyran, 1,4-dioxane, 2-methyltetrahydrofuran, etc.; acyclic polyethers, such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether, tetrabutylene glycol diethyl ether, etc.; and the like. Of these organic solvents, toluene, hexane, and cyclohexane are especially preferred. The organic solvent may be used solely or may be used in combination of two or more thereof. The use amount of the organic solvent is not particularly limited.

In the reaction of the titanocene dichloride (III) with trimethylaluminum, the titanocene dichloride (III) may be a uniform solution or a suspension, or may be in a solid state, and the trimethylaluminum may be diluted with the aforementioned organic solvent. The reaction method is not particularly limited, and examples thereof include a method of supplying trimethylaluminum into a suspension of the titanocene dichloride (III); a method of supplying a suspension of the titanocene dichloride (III) into a solution of trimethylaluminum diluted with the organic solvent to perform the reaction; and the like. On the occasion of allowing the titanocene dichloride (III) to react with trimethylaluminum, it is extremely preferred to perform the reaction in an inert gas atmosphere of nitrogen, helium, argon, etc. From the viewpoint of stability of the formed organic metal compound (I), it is extremely preferred to remove water, an alcohol, a ketone, oxygen, and the like from the raw materials and solvent to be used for the reaction in advance.

The use amount of trimethylaluminum has only to be 1 mol or more per 1 mol of the titanium atom of the titanocene dichloride (III), and it is preferably 1 to 100 molar times, and more preferably 2 to 5 molar times. Although a reaction temperature is not particularly limited, in general, it is preferably in the range of from 0 to 125° C., and more preferably in the range of 10 to 50° C. Although a reaction time is not particularly limited, too, in general, it is preferably in the range of from 1 to 200 hours, and more preferably in the range of from 24 to 100 hours.

A solution containing the organic metal compound (I) obtained through the reaction of the titanocene dichloride (III) with trimethylaluminum can be used for the hydrogenation reaction in the production method of the present invention as it is, or may also be used after removing the unreacted trimethylaluminum, by-produced dimethylaluminum chloride, and the like by means of distillation. Alternatively, after once isolating and purifying the organic metal compound (I) by applying a usual separation and purification method in the field of organometallic chemistry thereto, the organic metal compound (I) may be dissolved in a solvent of the same kind as in the solvent to be used for the hydrogenation reaction and used for the hydrogenation reaction. For example, after adding hexane or the like to a solution containing the organic metal compound (I) to deposit and isolate the organic metal compound (I), the organic metal compound (I) can be used for the production method of the present invention.

The silane compound having at least one silyl hydride bond, which is used for the production method of the present invention, is preferably at least one selected from the group consist of a silyl hydride compound represented by the following general formula (II-1), a silyl hydride polymer compound represented by the following general formula (II-2), a cyclic silyl hydride compound represented by the following general formula (II-3), and a silazane compound represented by the following general formula (II-4).

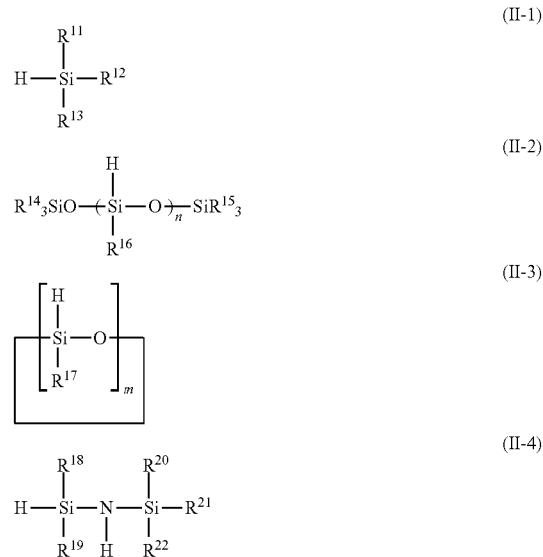

In the formulae, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ each independently represent a hydrogen atom, a halogen atom, an alkyl group, an aryl group, an aralkyl group, a cycloalkyl group, an alkoxy group, an aryloxy group, an aralkyloxy group, an acyloxy group, or a carboxyl group; n represents a positive integer of 0 or more; and m represents an integer of 2 to 5.

Examples of the silyl hydride compound represented by the general formula (II-1) include methyldichlorosilane, ethyldichlorosilane, propyldichlorosilane, butyldichlorosilane, pentyldichlorosilane, hexyldichlorosilane, heptyldichlorosilane, octyldichlorosilane, nonyldichlorosilane, decyldichlorosilane, phenyldichlorosilane, dimethylchlorosilane, diethylchlorosilane, dipropylchlorosilane, dibutylchlorosilane, dipentylchlorosilane, dihexylchlorosilane, diheptylchlorosilane, dioctylchlorosilane, dinonylchlorosilane, didecylchlorosilane, methylpropylchlorosilane, methylhexylchlorosilane, methylphenylchlorosilane, diphenylchlorosilane, dimethylmethoxysilane, dimethylethoxysilane, dimethylpropoxysilane, dimethylbutoxysilane, dimethylphenoxysilane, dimethylbenzyloxysilane, diethylmethoxysilane, diethylethoxysilane, diethylpropoxysilane, diethylbutoxysilane, diethylphenoxysilane, diethylbenzyloxysilane, dipropymethoxysilane, dipropylethoxysilane, dipropylpropoxysilane, dipropylbutoxysilane, dipropylphenoxysilane, dipropylbenzyloxysilane, dibutylmethoxysilane, dibutylethoxysilane, dibutylpropoxysilane, dibutylbutoxysilane, dibutylphenoxysilane, dibutylbenzyloxysilane, diphenylmethoxysilane, diphenylethoxysilane, diphenylpropoxysilane, diphenylbutoxysilane, diphenylphenoxysilane, diphenylbenzyloxysilane, dimethylsilane, diethylsilane, dipropylsilane, dibutylsilane, diphenylsilane, diphenylmethylsilane, diphenylethylsilane, diphenylpropylsilane, diphenylbutylsilane, trimethylsilane, triethylsilane, tripropylsilane, tributylsilane, triphenylsilane, methylsilane, ethylsilane, propylsilane, butylsilane, phenylsilane, methyldiacetoxysilane, and the like.

The silyl hydride polymer compound represented by the general formula (II-2) is preferably one wherein n is 0 to 100, and examples thereof include polymethylhydrosiloxane, polyethylhydrosiloxane, polypropylhydrosiloxane, polybutylhydrosiloxane, polypentylhydrosiloxane, polyhexylhydrosiloxane, polyheptylhydrosiloxane, polyoctylhydrosiloxane, polynonylhydrosiloxane, polydecylhydrosiloxane, polyphenylhydrosiloxane, 1,1,3,3-tetramethyldisiloxane, and the like.

Examples of the cyclic silyl hydride compound represented by the general formula (II-3) include methylhydrocyclosiloxane, ethylhydrocyclosiloxane, propylhydrocyclosiloxane, butylhydrocyclosiloxane, phenylhydrocyclosiloxane, and the like.

Examples of the silazane compound represented by the general formula (II-4) include 1,1,3,3-tetramethyldisilazane, 1,1,3,3-tetraethyldisilazane, 1,1,3,3-tetrapropyldisilazane, 1,1,3,3-tetrabutyldisilazane, 1,1,3,3-tetraphenyldisilazane, and the like.

Of those, from the viewpoints of easiness of industrial availability, costs, and so on, the silyl hydride polymer compound represented by the general formula (II-2) is preferred, and polymethylhydrosiloxane is more preferred. The silane compound (II) may be used solely or may be used in combination of two or more thereof.

It is extremely preferred to perform the production method of the present invention in the presence of a solvent. Such a solvent is not particularly limited so long as it is inert to the hydrogenation reaction, and examples thereof include saturated aliphatic hydrocarbons, such as butane, isobutane, pentane, isopentane, 2,2,4-trimethylpentane, hexane, heptane, isoheptane, octane, isooctane, nonane, decane, cyclopentane, cyclohexane, methylcyclohexane, ethylcyclohexane, cycloheptane, methylcycloheptane, etc.; alicyclic hydrocarbons, such as cyclohexane, methylcyclohexane, etc.; aromatic hydrocarbons, such as benzene, toluene, ethylbenzene, propylbenzene, butylbenzene, o-xylene, m-xylene, p-xylene, etc.; and the like.

The use amount of the solvent is preferably in the range of from 1 to 50% by mass, and more preferably in the range of from 5 to 25% by mass in terms of a concentration of the polymer to be subjected to the hydrogenation reaction. The solvent that is used for the production of a polymer can also be used as the solvent in the hydrogenation reaction that is the production method of the present invention as it is as the polymer solution, and such is preferred from the viewpoint of recovering and reusing the solvent. In that case, the polymer solution can also be stored in an atmosphere of an inert gas, such as nitrogen, argon, helium, etc., or a hydrogen gas preferably under a pressure ranging from atmospheric pressure to 5 MPaG at a temperature ranging from 0 to 50° C.

In the production method of the present invention, though the organic metal compound (I) can be supplied as a solid into the hydrogenation reaction system, from the viewpoints of easiness of handling and the matter that the use amount is readily precisely controllable, it is preferred that the organic metal compound (I) is dissolved in a solvent of the same kind as the solvent used in the hydrogenation reaction and used.

In the case of using the organic metal compound (I) after being dissolved in a solvent, its concentration is not particularly limited. The solution of the organic metal compound (I) dissolved in a solvent can be stored in an inert gas atmosphere of nitrogen, argon, helium, etc. preferably under a pressure ranging from atmospheric pressure to 0.5 MPaG at a temperature ranging from 0 to 50° C. A storage vessel is not particularly limited, and for example, a stainless steel vessel, a vessel in which the inside thereof is subjected to glass lining, and the like can be used.

In the strict sense, the use amount of the organic metal compound (I) is not limited; however, it is preferably in the range of from $1.0 \times 10^{-4}$ to $1.0 \times 10^{-1}$ mmol, and more preferably in the range of from $1.0 \times 10^{-3}$ to $1.0 \times 10^{-2}$ mmol in terms of a titanium atom of the organic metal compound (I) per 1 mol of the carbon-carbon double bond based on the conjugated diene structural unit of the polymer. When the use amount of the organic metal compound (I) falls within this range, industrially thoroughly practical reaction rate and hydrogenation rate can be achieved, and in particular, when it is $1.0 \times 10^{-2}$ mmol or less, even when after completion of the hydrogenation reaction, a step of removing the catalyst component containing the organic metal component (I) is not carried out, a coloring phenomenon in which the resulting hydrogenated polymer has a tinge of yellow, or the like is not found.

Although the amount of the aluminum atom relative to the titanium atom of the organic metal compound (I) is variable depending upon the production conditions of the organic metal compound (I), or the purification conditions, for example, whether the organic metal compound (I) is used after performing recrystallization or used without performing purification, an amount ranging from 0.5 to 100 mol may be taken as the amount of the aluminum atom per 1 mol of the titanium atom. From the viewpoint of enhancing the hydrogenation reactivity per the titanium atom, the amount of the aluminum atom is more preferably in the range of from 0.8 to 5 mol per 1 mol of the titanium atom.

In the production method of the present invention, though the silane compound (II) can be used as it is or after being dissolved in a solvent, from the viewpoints of easiness of handling and the matter that the use amount is readily precisely controllable, it is preferred that the silane compound (II) is dissolved in a solvent of the same kind as the solvent used in the hydrogenation reaction and used. In the case of using the silane compound (II) after being dissolved in a solvent, its concentration is not particularly limited.

The solution of the silane compound (II) dissolved in a solvent can be stored in an inert gas atmosphere of nitrogen, argon, helium, etc. preferably under a pressure ranging from atmospheric pressure to 0.5 MPaG at a temperature ranging from 0 to 50° C. A storage vessel is not particularly limited, and for example, a stainless steel vessel, a vessel in which the inside thereof is subjected to glass lining, and the like can be used.

In the strict sense, the use amount of the silane compound (II) is not limited; however, in general, it is preferably in the range of from 1 to 500 mol in terms of a number of silicon atoms having a silyl hydride bond per 1 mol of the titanium atom.

The production method of the present invention can be carried out by any of a batch method, a semi-batch method, and a continuous method. The form of a reactor is not particularly limited. The production method may be carried out in a complete mixing tank-type reactor or a tubular reactor, or by connecting two or more thereof in series or parallel. From the viewpoint of increasing a dissolution rate of the hydrogen gas in the reaction system, it is preferred to continuously supply the hydrogen gas from a bottom of the reactor. A loop-venturi reactor as a tubular reactor equipped with an ejector having a mixing chamber can also be used.

In the case of performing the production method of the present invention by the batch reaction, after rending the reactor in a hydrogen atmosphere and first charging the polymer solution, subsequently, (A) a method in which a solution obtained by mixing a solution of the organic metal compound (I) and a solution of the silane compound (II) in advance is introduced; (B) a method in which a solution of the organic metal compound (I) is introduced, and then, a solution of the silane compound (II) is introduced; (C) a method in which a solution of the silane compound (II) is introduced, and then, a solution of the organic metal compound (I) is introduced; and the like may be adopted. Of these, from the standpoint that an apparatus for mixing a solution of the organic metal compound (I) and a solution of the silane compound (II) in advance is not required, the method (B) and the method (C) are preferred, and from the standpoint of practically using the effect of the silane compound (II) from the initial stage of the hydrogenation reaction, the method (C) is more preferred.

In general, a reaction temperature in the production method of the present invention can be preferably chosen within the range of from −20 to 250° C. that is a solidification point of the solvent or higher and a thermal decomposition temperature of the polymer or lower. From the viewpoints that the hydrogenation reaction activity can be thoroughly revealed and that the hydrogenated polymer can be industrially advantageously produced, a range of from 30 to 150° C. is preferred, and from the viewpoint that the use amounts of the organic metal compound (I) as the catalyst component and the silane compound (II) can be decreased, a range of from 60 to 90° C. is more preferred.

In the production method of the present invention, a hydrogen gas can be used as the hydrogen molecule. In the strict sense, a pressure of the hydrogen gas is not limited; however, from the viewpoints that the hydrogenation reaction activity can be thoroughly revealed and that the hydrogenated polymer can be industrially advantageously produced, a range of from 0 (atmospheric pressure) to 20 MPaG in terms of a gauge pressure is preferred, and from the viewpoint that the use amounts of the organic metal compound (I) as the catalyst component and the silane compound (II) can be decreased, a range of from 0.5 to 10 MPaG is more preferred.

Although a time required for the hydrogenation reaction is variable according to reaction conditions such as the use amounts of the organic metal compound (I) as the catalyst component and the silane compound (II), the reaction temperature, the hydrogen gas pressure, etc., in general, it is preferably in the range of from 10 minutes to 24 hours when the point of time when the supply of the organic metal compound (I) as the catalyst component into the reaction system is completed is defined as 0 minute of the reaction commencement.

As for the reaction liquid after completion of the hydrogenation reaction, if desired, after further diluting with a solvent or concentration, the resultant is washed with a basic aqueous solution or an acidic aqueous solution, whereby the organic metal compound (I) as the catalyst component and the silane compound (II), and so on can be removed. In the case where the use amount of the organic metal compound (I) is small, the reaction liquid may be concentrated without washing and supplied into an extruder, if desired, thereby isolating the hydrogenated polymer; the reaction liquid may be brought into contact with steam without washing to remove the solvent and so on, thereby isolating the hydrogenated polymer; or the reaction liquid may be brought into contact with an inert gas in a heated state to remove the solvent and so on, thereby isolating the hydrogenated polymer.

In Referential Examples, the production and analysis of the organic metal compound (I) used in Examples and Comparative Examples are described in detail. The production of the organic metal compound (I) was carried out at room temperature at atmospheric pressure in an argon atmosphere, unless otherwise indicated. In addition, as toluene and hexane, those obtained by distillation using sodium hydride as a drying agent in an argon atmosphere were used.

A molar concentration of a titanium atom in a catalyst liquid containing the organic metal compound (I) was quantitatively determined by analyzing a wet decomposition product using a polarized Zeeman atomic absorption spectrophotometer (Z-2000 Model, manufactured by Hitachi, Ltd.). A total molar amount of the titanium atom in the acquired catalyst liquid was calculated from the catalyst liquid mass and the molar concentration of a titanium atom in the catalyst liquid determined from the atomic absorption analysis. That is, a proportion of the total molar amount of the titanium atom in the acquired catalyst liquid relative to the charged molar amount of the titanium atom on the occasion of producing a catalyst liquid was defined as a yield (%) and calculated according to the following numerical expression 1. Each amount in the expression is mol.

Yield (%)=100×(Total molar amount of titanium atom in acquired catalyst liquid based on atomic absorption analysis)/(Charged molar amount of titanium atom)  [Math. 1]

The titanium compound existent in the catalyst liquid acquired in each of the Referential Examples may take structures of the following general formulae IV-1 to IV-6.

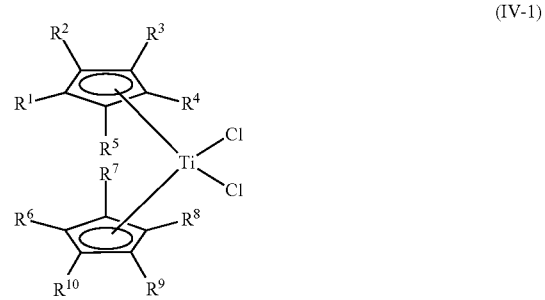

(IV-1)

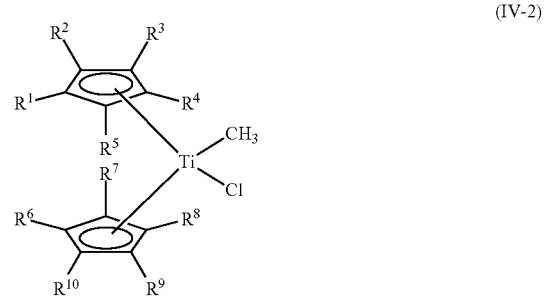

(IV-2)

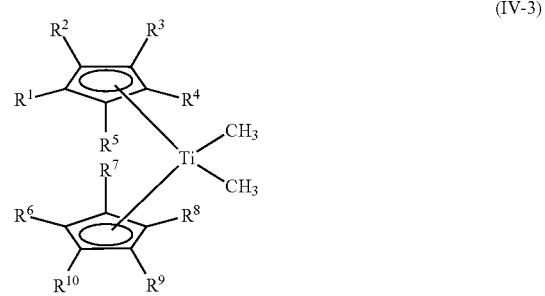

(IV-3)

-continued

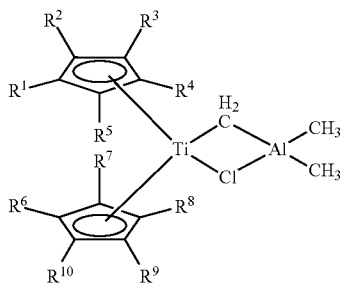

(IV-4)

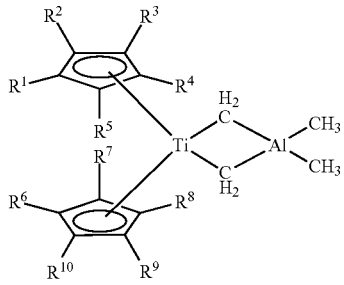

(IV-5)

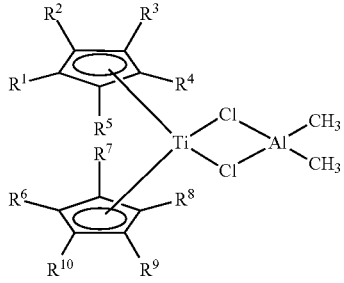

(IV-6)

In the formulae, $R^1$ to $R^{10}$ are those as defined above.

A solution of 0.3 g of a catalyst liquid diluted with 0.3 g of dehydrated deuterium benzene-$d_6$ was measured by the $^1$H-nuclear magnetic resonance spectrometry (hereinafter abbreviated as "$^1$H-NMR analysis") [nuclear magnetic resonance apparatus: JNM-ECS400, manufactured by JEOL Ltd.], each of Titanium Compounds IV-1 to IV-5 was subjected to structure assignment from a chemical shift, and a molar amount of each of IV-1 to IV-5 contained in 1 g of the catalyst liquid was calculated from a relative peak area value to benzene.

As for Titanium Compound IV-6, since it is difficult to perform precise quantitative determination from a peak area value of $^1$H-NMR with paramagnetic nuclide, a value obtained by subtracting the molar amount of each of Titanium Compounds IV-1 to IV-5 calculated by the $^1$H-NMR analysis from the molar amount of the titanium atom contained in 1 g of the catalyst liquid based on the atomic absorption analysis was defined as a molar amount of Titanium Compound IV-6. In addition, using the molar amount of each of Titanium Compounds IV-1 to IV-6 contained in 1 g of the catalyst liquid, an Al/Ti ratio as a ratio of the aluminum atom to one atom of titanium was calculated.

A proportion of the molar amount of the titanium atom having the IV-4 structure as the organic metal compound (I) relative to the total molar amount of the titanium atom in the catalyst liquid was defined as a purity (%) and calculated according to the following numerical expression 2. Each amount in the expression is mol.

$$\text{Purity (\%)}=100\times(\text{Molar amount of titanium atom having IV-4 structure})/(\text{Total molar amount of titanium atom in catalyst liquid}) \quad [\text{Math.2}]$$

Referential Example 1

In a 200-mL volume three-neck flask equipped with a thermometer and a rotator, in which after drying under reduced pressure, the interior thereof had been purged with argon, 25.0 g (100.40 mmol) of bis(cyclopentadienyl)titanium dichloride ($Cp_2TiCl_2$, manufactured by Wako Pure Chemical Industries, Ltd.) and 30 g of toluene were added and stirred at 25±2° C. for 30 minutes, subsequently, 112.0 mL of a toluene solution of trimethylaluminum (201.6 mmol as trimethylaluminum, manufactured by Tokyo Chemical Industry Co., Ltd.) was added over 10 minutes, and the contents were allowed to react with each other at 25±3° C. for 60 hours. The resulting reaction liquid was concentrated at 10 mmHg (1.33 kPa) at 30° C. for one hour; about 134 mL of a mixture containing unreacted trimethylaluminum, by-produced chlorodimethylaluminum, and toluene was distilled away; the pressure was then returned to atmospheric pressure with argon; about 50 mL of toluene was added to the residual liquid; the temperature was raised to 30° C.; and the contents were dissolved over 30 minutes. The resulting solution was cooled to 0° C. and stirred for one hour. As a result, a brown crystal was deposited. A supernatant was removed by means of decantation; 46 g of toluene was added to 8.5 g of the resulting brown crystal; the temperature was raised to 30° C.; and the resultant was stirred for dissolution for 30 minutes, thereby obtaining a catalyst liquid (hereinafter referred to as "Catalyst Liquid A"). A total time required from reaction commencement until completion of the preparation of Catalyst Liquid A was about 64 hours.

As a result of the atomic absorption analysis, the Catalyst Liquid A contained 2.57% by mass of a titanium atom (concentration: 0.537 mmol/g), and a total mass of the Catalyst Liquid A was 54.5 g. Thus, the yield based on the numerical expression 1 was 29.1%.

The Catalyst Liquid A was subjected to $^1$H-NMR analysis within one hour after completion of the preparation. As a result, any peaks capable of being assigned to IV-1, IV-3, and IV-6 could not be observed. As for IV-2, a peak capable of being assigned to the methyl group could be observed at δ-1.13 ppm (3H, s), and a peak capable of being assigned to the cyclopentadienyl ring could be observed at δ5.97 ppm (10H, s), and the concentration was 0.017 mmol/g. As for IV-4, a peak capable of being assigned to the methylene group could be observed at δ8.49 ppm (2H, s), a peak capable of being assigned to the cyclopentadienyl ring could be observed at δ5.85 ppm (10H, s), and a peak capable of being assigned to the dimethylaluminum group could be observed at δ-0.11 ppm (6H, s), and the concentration was 0.496 mmol/g. As for IV-5, a peak capable of being assigned to the methylene group could be observed at δ7.88 ppm (2H, s), a peak capable of being assigned to the cyclopentadienyl ring could be observed at δ5.85 ppm (10H, s), and a peak capable of being assigned to the dimethylaluminum group could be observed at δ-0.03 ppm (6H, s), and the concentration was 0.019 mmol/g. The concentration of IV-6 obtained from the results of $^1$H-NMR analysis and atomic absorption analysis was 0.005 mmol/g. From the concentrations of the Titanium Compounds IV-1 to IV-6, the purity was 92.4%, and the Al/Ti ratio was 0.97.

In the present Referential Example 1, all of $R^1$ to $R^{10}$ in IV-1 to IV-6 represent a hydrogen atom.

Referential Example 2

In a 100-mL volume three-neck flask equipped with a thermometer and a rotator, in which after drying under reduced pressure, the interior thereof had been purged with argon, 7.9 g (31.7 mmol) of bis(cyclopentadienyl)titanium dichloride ($Cp_2TiCl_2$, manufactured by Wako Pure Chemical Industries, Ltd.) and 21.5 g of toluene were added and stirred at 25±2° C. for 30 minutes, subsequently, 35.0 mL of a toluene solution of trimethylaluminum (63.5 mmol as trimethylaluminum, manufactured by Tokyo Chemical Industry Co., Ltd.) was added over 10 minutes, and the contents were allowed to react with each other at 25±3° C. for 60 hours, thereby obtaining a catalyst liquid (hereinafter referred to as "Catalyst Liquid B"). A total time required from the reaction commencement until completion of the reaction was about 60 hours.

As a result of the atomic absorption analysis, the Catalyst Liquid B contained 2.60% by mass of a titanium atom (concentration: 0.543 mmol/g), and a total mass of the Catalyst Liquid B was 57.2 g. Thus, the yield based on the numerical expression 1 was 98.0%.

The Catalyst Liquid B was subjected to $^1$H-NMR analysis within one hour after completion of the reaction. As a result, any peaks capable of being assigned to IV-1, IV-5, and IV-6 could not be observed. As for IV-2, a peak capable of being assigned to the methyl group could be observed at $\delta$1.13 ppm (3H, s), and a peak capable of being assigned to the cyclopentadienyl ring could be observed at $\delta$5.97 ppm (10H, s), and the concentration was 0.064 mmol/g. As for IV-3, a peak capable of being assigned to the methyl group could be observed at $\delta$3.26 ppm (6H, s), and a peak capable of being assigned to the cyclopentadienyl ring could be observed at $\delta$5.85 ppm (10H, s), and the concentration was 0.012 mmol/g. As for IV-4, a peak capable of being assigned to the methylene group could be observed at $\delta$8.49 ppm (2H, s), a peak capable of being assigned to the cyclopentadienyl ring could be observed at $\delta$5.85 ppm (10H, s), and a peak capable of being assigned to the dimethylaluminum group could be observed at $\delta$-0.11 ppm (6H, s), and the concentration was 0.304 mmol/g. The concentration of IV-6 obtained from the results of $^1$H-NMR analysis and atomic absorption analysis was 0.163 mmol/g. From the concentrations of the Titanium Compounds IV-1 to IV-6, the purity was 56.0%, and from the amount of chemical liquid charged, the Al/Ti ratio was 2.00.

In the present Referential Example 2, all of $R^1$ to $R^{10}$ in IV-1 to IV-6 represent a hydrogen atom.

EXAMPLES

The present invention is hereunder described in more detail by reference to Examples and so on, but it should be construed that the present invention is by no means limited by such Examples and so on. The term "MPaG" as a pressure means a gauge pressure. In addition, the chemicals used are as follows. The production of a polymer in each of Production Examples was performed in a nitrogen gas atmosphere unless otherwise indicated.

Cyclohexane: One obtained by dehydrating using Molecular Sieves 3A and further bubbling with a nitrogen gas was used.

sec-Butyllithium: A cyclohexane solution of 1.32 mmol/g of sec-butyllithium was used.

N,N,N',N'-Tetramethylethylenediamine: One obtained by dehydrating with neutral activated alumina and further bubbling with a nitrogen gas, followed by diluting with cyclohexane to be used for polymerization was used.

Tetrahydrofuran: One obtained by dehydrating with neutral activated alumina and further bubbling with a nitrogen gas, followed by diluting with cyclohexane to be used for polymerization was used.

Butadiene, isoprene, and a mixture of butadiene and isoprene: Each of those obtained by removing moisture and a polymerization inhibitor using Molecular Sieves 3A and neutral activated alumina was used in a nitrogen atmosphere.

Styrene: One obtained by removing moisture and a polymerization inhibitor with neutral activated alumina and further bubbling with a nitrogen gas was used.

Silane compound (II):
Polymethylhydrosiloxane 1 (manufactured by Sigma-Aldrich, number average molecular weight: 1,700 to 3,200)
Polymethylhydrosiloxane 2 (manufactured by Sigma-Aldrich, number average molecular weight: 390)

Each of those obtained by bubbling with a nitrogen gas, followed by diluting with cyclohexane to be used for polymerization was used.

Organic Metal Compound (I):
As for the Catalyst Liquid A produced in Referential Example 1, one obtained by moving into a shielded vessel and stored in a nitrogen atmosphere at 8±2° C. for 5 to 30 days while defining the point of time at which the preparation of the Catalyst Liquid A was completed as day 0 of the storage was used for the reaction.

As for the Catalyst Liquid B produced in Referential Example 2, one obtained by moving into a shielded vessel and stored in a nitrogen atmosphere at 8±2° C. within 2 days while defining the point of time at which the preparation of the Catalyst Liquid B was completed as day 0 of the storage was used for the reaction.

Production Example 1

After purging the interior of a 10-L volume autoclave made of HASTELLOY (a registered trademark), which was equipped with a thermometer, an electric heater, an electromagnetic induction stirrer, and a sampling port, with a nitrogen gas, 5,291.0 g of cyclohexane and 2.529 g of a cyclohexane solution of 1.33 mmol/g of sec-butyllithium (3.364 mmol as sec-butyllithium) were added, and the temperature was raised to 50° C. over 30 minutes while stirring at 500 rpm. Subsequently, 99.1 g (951.33 mmol) of styrene was collectively added into the autoclave, the pressure was increased to 0.3 MPaG using a nitrogen gas, and the reaction was performed at a liquid temperature of 53±3° C. for one hour. Subsequently, 5.248 g of a cyclohexane solution of 0.29 mmol/g of N,N,N',N'-tetramethylethylenediamine (1.535 mmol as N,N,N',N'-tetramethylethylenediamine) was added into the autoclave, and 389.4 g (7,198.1 mmol) of butadiene was further added into the autoclave over 10 minutes. The pressure was increased to 0.4 MPaG using a nitrogen gas, and the reaction was performed at a liquid temperature of 53±3° C. for 3 hours. Subsequently, 99.1 g (951.33 mmol) of styrene was collectively added, the pressure was increased to 0.5 MPaG using a nitrogen gas, and the reaction was performed at a liquid temperature of 53±3° C. for 1.5 hours, thereby obtaining a reaction mixed liquid containing a living polymer.

After decreasing the pressure of the nitrogen gas into the reaction mixed liquid to 0.1 MPaG, the pressure was increased to 1.0 MPaG using a hydrogen gas, and the contents were treated at a liquid temperature of 53±3° C. for one hour, thereby obtaining 5,886.3 g of a solution containing Polymer A (hereinafter referred to as "Polymer Solution A"). In view of the fact that the content of the Polymer A was 587.5 g, the Polymer A concentration in the Polymer Solution A was 9.98% by mass, the lithium atom concentration was 0.5256 mmol/kg from the use amount of sec-butyl-lithium, and the butadiene unit content in the Polymer A was 66.3% by mass from the use amounts of butadiene and styrene.

g of acetone was added to 5 g of the Polymer Solution A, and methanol was further properly added to deposit and recover the Polymer A, followed by drying at 60° C. for one hour to acquire the Polymer A. A weight average molecular weight Mw and a molecular weight distribution Mw/Mn of the Polymer A as expressed in terms of standard polystyrene measured were determined by gel permeation chromatography (hereinafter referred to as "GPC"), and the content proportions of bonding modes of the conjugated diene (1,2-bond unit and 1,4-bond unit in the butadiene unit; and 1,2-bond unit, 3,4-bond unit, and 1,4-bond unit further in the isoprene unit in the Production Examples as mentioned later, as the case may be) were determined by $^1$H-NMR analysis. The measurements conditions are as follows.

[GPC Analysis]

Apparatus: HLC-8320GPC EcoSEC System, manufactured by Tosoh Corporation

Sample: A solution of 5 mg of a polymer dissolved in 10 mL of tetrahydrofuran

Injection amount of sample: 1 μL

Column: TSKgel SuperHZ4000, manufactured by Tosoh Corporation (inner diameter: 4.6 mm, length: 150 mm)

Column temperature: 40° C.

Eluant: Tetrahydrofuran

Flow rate of eluant: 1.0 mL/min

Detector: UV detector (detection wavelength: 254 nm)

Calibration curve: Prepared using standard polystyrene

As a result of the GPC analysis, the weight average molecular weight Mw was 303,100, and the molecular weight distribution Mw/Mn was 1.06.

[$^1$H-NMR Analysis]

Apparatus: AVANCE III 600 USPlus, manufactured by Bruker BioSpin

Sample: A solution of 50 mg of a polymer dissolved in 1.0 g of deuterium chloroform Standard substance: Tetramethylsilane Measurement temperature: 32° C. (305K)

Cumulated number: 256 times

A proportion [degree of vinylation (%)] of the branched bond units (1,2-bond unit and 3,4-bond unit) relative to a total molar amount of the conjugated dienes contained in the polymer was calculated according to the following numerical expression 3.

Degree of vinylation (%)=100×(Molar amount of branched bond units)/(Total molar amount of conjugated dienes) [Math. 3]

From area values of a peak δ4.8 to 5.1 ppm (2H) capable of being assigned to the 1,2-bond unit of butadiene and a peak δ5.2 to 5.5 ppm (2H) capable of being assigned to the 1,4-bond unit of butadiene, the degree of vinylation of the Polymer A was 38.5%.

Example 1

The interior of a 3-L volume SUS316-made autoclave equipped with a thermometer, an electric heater, an electromagnetic induction stirrer, a hydrogen supply port, a supply port of the Polymer Solution A, a 10-mL glass-made pressure bottle, and a sampling port was purged with a hydrogen gas, 750 g of the Polymer Solution A (containing 73.866 g of the Polymer A) was sent under pressure using a hydrogen gas, and the temperature was then raised to 75° C. for about 20 minutes while stirring at 500 rpm. 15.684 g of a solution obtained by diluting the Polymethylhydrosiloxane 1 with cyclohexane to an extent of 0.0742 mmol/g as a silicon atom content (1.164 mmol as the silicon atom) was added thereto; the pressure was increased to 0.8 MPaG using a hydrogen gas; subsequently, 15.950 g of a solution obtained by diluting the Catalyst Liquid A with cyclohexane to an extent of 2.89×10$^{-4}$ mmol/g as a titanium atom (4.61×10$^{-3}$ mmol as the titanium atom) was sent under pressure (1.0 MPaG) using a hydrogen gas and supplied from a 10-mL glass-made pressure bottle; and the liquid temperature was controlled to a range of 75±2° C. while supplying hydrogen so as to keep the internal pressure of the autoclave at 1.0 MPaG, thereby performing the hydrogenation reaction.

Here, in the reaction system immediately after supplying the Catalyst Liquid A, 73.866 g of the Polymer A was existent, and 890.0 mmol of the carbon-carbon double bond based on the butadiene unit, 0.420 mmol of the lithium atom, 4.61×10$^{-3}$ mmol of the titanium atom, 4.47×10$^{-3}$ mmol of the aluminum atom, and 1.164 mmol of the silicon atom were existent. That is, the use amount of the titanium atom per 1 mol of the carbon-carbon double bond based on the butadiene unit was 5.18×10$^{-3}$ mmol; the use amount of titanium atom relative to the Polymer A was 3.0 ppm; a ratio of the lithium atom to one titanium atom (hereinafter referred to as "Li/Ti ratio") was 91.1; an Al/Ti ratio was 0.97; and a ratio of the silicon atom to one titanium atom (hereinafter referred to as "Si/Ti ratio") was 252.5.

The state of progress of the hydrogenation reaction was analyzed in the following manner. That is, the point of time when the supply of the Catalyst Liquid A into the reaction system was completed was defined as 0 minute of the reaction commencement, and after elapsing 15 minutes, 30 minutes, 1 hour, 2 hours, 3 hours, 4 hours, 5 hours, 7 hours, and 9 hours, respectively, 5 g of the reaction liquid was sampled; 5 g of acetone and properly methanol were added to deposit and recover the Polymer A during the hydrogenation reaction; a $^1$H-NMR spectrum of a solution obtained by dissolving 50 mg of the recovered Polymer A in 1 g of deuterium chloroform was measured in the same manner as the measurement of the Polymer A; and from an integrated value of peaks at δ4.8 to 5.1 ppm capable of being assigned to the 1,2-bond unit based on butadiene and δ5.2 to 5.5 ppm capable of being assigned to the 1,4-bond unit based on butadiene, the content of a non-hydrogenated carbon-carbon double bond was quantitatively determined. A change with time of the hydrogenation rate is shown in Table 1.

A change of the integrated value of peaks at δ6.2 to 7.5 ppm capable of being assigned to the hydrogen atom bonded to the aromatic ring of styrene was simultaneously observed. However, no change was found.

Example 2

The same operations as in Example 1 were followed, except that in Example 1, the use amount of the solution obtained by diluting the Catalyst Liquid A with cyclohexane to an extent of 2.89×10$^{-4}$ mmol/g as a titanium atom (hereinafter referred to as "Diluted Liquid of Catalyst Liquid A") was changed from 15.950 g to 5.137 g (1.48×10$^{-3}$ mmol as the titanium atom); and the use amount of the solution obtained by diluting the Polymethylhydrosiloxane 1 with cyclohexane to an extent of 0.0742 mmol/g as a silicon atom content (hereinafter referred to as "Silane Compound Diluted Liquid 1") was changed from 15.684 g to 5.051 g (0.375 mmol as the silicon atom).

In the reaction system immediately after commencement of the hydrogenation reaction, 73.866 g of the Polymer A was existent, and 890.0 mmol of the carbon-carbon double bond based on the butadiene unit, 0.420 mmol of the lithium atom, $1.48 \times 10^{-3}$ mmol of the titanium atom, $1.43 \times 10^{-3}$ mmol of the aluminum atom, and 0.375 mmol of the silicon atom were existent. That is, the use amount of the titanium atom per 1 mol of the carbon-carbon double bond based on the butadiene unit was $1.67 \times 10^{-3}$ mmol, and the use amount of titanium atom relative to the Polymer A was 1.0 ppm. The Li/Ti ratio, the Al/Ti ratio, the Si/Ti ratio, and the hydrogenation rate are shown in Table 1.

Example 3

The same operations as in Example 1 were followed, except that in Example 1, the use amount of the Diluted Liquid of Catalyst Liquid A was changed from 15.950 g to 39.878 g ($1.15 \times 10^{-2}$ mmol as the titanium atom); and the use amount of the Silane Compound Diluted Liquid 1 was changed from 15.684 g to 39.210 g (2.909 mmol as the silicon atom).

In the reaction system immediately after commencement of the hydrogenation reaction, 73.866 g of the Polymer A was existent, and 890.0 mmol of the carbon-carbon double bond based on the butadiene unit, 0.420 mmol of the lithium atom, $1.15 \times 10^{-2}$ mmol of the titanium atom, $1.11 \times 10^{-2}$ mmol of the aluminum atom, and 2.909 mmol of the silicon atom were existent. That is, the use amount of the titanium atom per 1 mol of the carbon-carbon double bond based on the butadiene unit was $1.29 \times 10^{-2}$ mmol, and the use amount of titanium atom relative to the Polymer A was 7.5 ppm. The Li/Ti ratio, the Al/Ti ratio, the Si/Ti ratio, and the hydrogenation rate are shown in Table 1.

Example 4

The same operations as in Example 3 were followed, except that in Example 3, the Silane Compound Diluted Liquid 1 was added not before supplying the Diluted Liquid of Catalyst Liquid A but 2 hours after the reaction commencement. That is, the silicon atom was not existent in the reaction system in a range of from 0 to 2 hours of the reaction, and on or after elapsing 2 hours from reaction commencement, 2.909 mmol of the silicon atom was existent. The Li/Ti ratio, the Al/Ti ratio, the Si/Ti ratio, and the hydrogenation rate are shown in Table 1.

Comparative Example 1

The same operations as in Example 3 were followed, except that in Example 3, the Silane Compound Diluted Liquid 1 was not added. The Li/Ti ratio, the Al/Ti ratio, the Si/Ti ratio, and the hydrogenation rate are shown in Table 1.

Comparative Example 2

The same operations as in Example 1 were followed, except that in Example 1, the use amount of the Diluted Liquid of Catalyst Liquid A was changed from 15.950 g to 79.986 g ($2.31 \times 10^{-2}$ mmol as the titanium atom); and the Silane Compound Diluted Liquid 1 was not added. The Li/Ti ratio, the Al/Ti ratio, the Si/Ti ratio, and the hydrogenation rate are shown in Table 1.

Comparative Example 3

The same operations as in Example 1 were followed, except that in Example 1, the use amount of the Diluted Liquid of Catalyst Liquid A was changed from 15.950 g to 39.878 g ($1.15 \times 10^{-2}$ mmol as the titanium atom); 2 hours after the reaction commencement, 39.878 g ($1.15 \times 10^{-2}$ mmol as the titanium atom) of the Diluted Liquid of Catalyst Liquid A was additionally supplied into the reaction system; and the Silane Compound Diluted Liquid 1 was not added. The Li/Ti ratio, the Al/Ti ratio, the Si/Ti ratio, and the hydrogenation rate are shown in Table 1.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Ti content (ppm) |  | 3.0 | 1.0 | 7.5 | 7.5 | 7.5 | 15.0 | 0 to 2 hr: 7.5 |
|  |  |  |  |  |  |  |  | 2 to 4 hr: 15.0 |
| Li/Ti ratio |  | 91.1 | 282.9 | 36.4 | 36.4 | 36.4 | 18.2 | 0 to 2 hr: 36.4 |
|  |  |  |  |  |  |  |  | 2 to 4 hr: 18.2 |
| Al/Ti ratio |  | 0.97 | 0.97 | 0.97 | 0.97 | 0.97 | 0.97 | 0.97 |
| Si/Ti ratio |  | 252.5 | 252.4 | 252.4 | 0 to 2 hr: 0 | — | — | — |
|  |  |  |  |  | 2 to 4 hr: 252 |  |  |  |
| Hydrogenation rate (%) | 15 min | 8.3 | 3.8 | 17.4 | 13.6 | 13.4 | 45.9 | 15.7 |
|  | 30 min | 17.7 | 5.6 | 45.6 | 25.2 | 25.6 | 86.5 | 27.8 |
|  | 1 hr | 40.9 | 10.9 | 97.6 | 52.1 | 52.1 | 88.0 | 53.3 |
|  | 2 hr | 97.0 | 22.2 | 99.7 | 88.9 | 88.7 | 88.7 | 90.0 |
|  | 4 hr | 99.3 | 54.5 | 99.7 | 91.6 | 89.5 | 89.3 | 90.5 |
|  | 6 hr | — | 94.5 | — | — | — | — | — |
|  | 9 hr | — | 98.6 | — | — | — | — | — |

Hydrogenation reaction temperature: 75° C., hydrogen gas pressure: 1.0 MPaG

It is noted from Examples 1 to 3 that by making the silane compound (II) coexistent in the organic metal compound (I) and performing the hydrogenation reaction, even when the titanium concentration is extremely low, it is possible to drive the reaction with high activity to an extent of close to 100%. In Example 1, the hydrogenation rate reached 99.3% for a reaction time of 4 hours, and in Example 2, the hydrogenation rate reached 98.6% for a reaction time of 9 hours.

On the other hand, in the Comparative Examples in which the silane compound (II) was not made coexistent, not only the hydrogenation reaction activity is poor, but also the reaction cannot be driven. In Comparative Example 1, on or after elapsing 2 hours from the reaction commencement, the progress of the hydrogenation reaction reaches a limit, and the hydrogenation rate is limited to 89.5% for a reaction time of 4 hours. In Comparative Example 2, nevertheless the titanium concentration is 15 times that of Example 2, the progress of the hydrogenation reaction reaches a limit, and the hydrogenation rate is limited to 89.3% for a reaction time of 4 hours. In Comparative Example 3, 2 hours after the reaction commencement, the organic metal compound (I) was additionally supplied to perform the hydrogenation reaction, but the hydrogenation rate is not substantially improved.

It is noted that in Example 4, when 2 hours after the reaction commencement, the silane compound (II) is added, the hydrogenation rate is improved by 2.7% during a period of the reaction of 2 to 4 hours as compared with Comparative Example 1, and the silane compound accelerates the hydrogenation reaction.

Example 5

The same operations as in Example 1 were followed, except that in Example 1, a solution obtained by diluting the Catalyst Liquid B with cyclohexane to an extent of $2.89 \times 10^{-4}$ mmol/g as a titanium atom was used in an amount of 15.95 g ($4.61 \times 10^{-3}$ mmol as the titanium atom) in place of 15.95 g ($4.62 \times 10^{-3}$ mmol as the titanium atom) of the Diluted Liquid of Catalyst Liquid A. The Al/Ti ratio was 2.00. The hydrogenation rate is shown in Table 2.

Production Example 2

In Production Example 1, after decreasing the pressure of the nitrogen gas into the reaction mixed liquid containing the living polymer to 0.1 MPaG, 7.748 g of a cyclohexane solution containing 1% by mass of ethanol (1.682 mmol as ethanol) was added, the pressure was then increased to 1.0 MPaG using a hydrogen gas, and the contents were treated at a liquid temperature of 53±3° C. for one hour, thereby obtaining 5,886.3 g of a solution containing Polymer B (hereinafter referred to as "Polymer Solution B"). A molar ratio of the lithium atom derived from the sec-butyllithium (3.364 mmol) used for the polymerization to ethanol (1.682 mmol) was 0.50.

Example 6

The same operations as in Example 1 were followed, except that in Example 1, 750 g of the Polymer Solution B (containing 73.866 g of the Polymer B) was used in place of 750 g of the Polymer Solution A (containing 73.866 g of the Polymer A). The hydrogenation rate is shown in Table 2.

Example 7

The same operations as in Example 1 were followed, except that in Example 1, a solution obtained by diluting the Polymethylhydrosiloxane 2 with cyclohexane to an extent of 0.0742 mmol/g as a silicon atom content was used in an amount of 15.684 g (1.164 mmol as the silicon atom) in place of 15.684 g (1.164 mmol as the silicon atom) of the Silane Compound Diluted Liquid 1. The Si/Ti ratio is 252.4. The hydrogenation rate is shown in Table 2.

Example 8

The same operations as in Example 1 were followed, except that in Example 1, the use amount of the Silane Compound Diluted Liquid 1 was changed from 15.684 g to 7.960 g (0.591 mmol as the silicon atom). The Si/Ti ratio is 128.1. The hydrogenation rate is shown in Table 2.

Example 9

The same operations as in Example 1 were followed, except that in Example 1, the use amount of the Silane Compound Diluted Liquid 1 was changed from 15.684 g to 31.368 g (2.328 mmol as the silicon atom). The Si/Ti ratio is 504.9. The hydrogenation rate is shown in Table 2.

Example 10

The same operations as in Example 1 were followed, except that in Example 1, the hydrogenation reaction was performed while supplying hydrogen so as to keep the internal pressure of the autoclave at 3.0 MPaG. The hydrogenation rate is shown in Table 2.

Example 11

The same operations as in Example 1 were followed, except that in Example 1, the hydrogenation reaction was performed so as to keep the liquid temperature at 85±2° C. The hydrogenation rate is shown in Table 2.

Example 12

The same operations as in Example 1 were followed, except that in Example 1, the hydrogenation reaction was performed so as to keep the liquid temperature at 65±2° C. The hydrogenation rate is shown in Table 2.

TABLE 2

|  |  | Example 1 | Example 5 | Example 6 | Example 7 | Example 8 | Example 9 | Example 10 | Example 11 | Example 12 |
|---|---|---|---|---|---|---|---|---|---|---|
| Temperature (° C.) | | 75 | 75 | 75 | 75 | 75 | 75 | 75 | 85 | 65 |
| Pressure (MPaG) | | 1.0 | 1.0 | 1.0 | 1.0 | 3.0 | 1.0 | 3.0 | 1.0 | 1.0 |
| Polymer solution | | A | A | B | A | A | A | A | A | A |
| Ti content (ppm) | | 3.0 | 3.0 | 3.0 | 3.0 | 3.0 | 3.0 | 3.0 | 3.0 | 3.0 |
| Li/Ti ratio | | 90.9 | 90.9 | 90.9 | 90.9 | 90.9 | 90.9 | 90.9 | 90.9 | 90.9 |
| Al/Ti ratio | | 0.97 | 2.00 | 0.97 | 0.97 | 0.97 | 0.97 | 0.97 | 0.97 | 0.97 |
| Si/Ti ratio | | 252.5 | 252.5 | 252.5 | 252.4 | 128.1 | 504.9 | 252.5 | 252.5 | 252.5 |
| Hydrogenation rate (%) | 15 min | 8.3 | 5.3 | 8.9 | 5.4 | 6.6 | 7.9 | 14.9 | 14.2 | — |
| | 30 min | 17.7 | 10.7 | 12.8 | 10.9 | 15.2 | 16.9 | 27.5 | 26.4 | 5.3 |
| | 1 hr | 40.9 | 22.5 | 26.1 | 21.4 | 32.1 | 39.7 | 61.0 | 86.1 | 12.6 |
| | 2 hr | 97.0 | 58.3 | 87.5 | 45.1 | 95.3 | 97.4 | 93.8 | 95.2 | 28.7 |
| | 4 hr | 99.3 | 96.1 | 99.4 | 93.4 | 99.3 | 99.4 | 97.4 | 99.1 | 94.0 |
| | 5 hr | — | 98.1 | — | 95.4 | — | — | — | — | — |

TABLE 2-continued

| | Example 1 | Example 5 | Example 6 | Example 7 | Example 8 | Example 9 | Example 10 | Example 11 | Example 12 |
|---|---|---|---|---|---|---|---|---|---|
| 6 hr | — | — | — | 97.0 | — | — | 99.1 | — | 99.0 |
| 7 hr | — | — | — | 98.3 | — | — | — | — | — |

It is noted from the results of Example 5 that even by using the catalyst liquid in the production method of the present invention without isolating the organic metal compound (I), the desired hydrogenation reaction proceeds without any problem.

It is noted from the results of Example 6 that the production method of the present invention can also be applied to the polymer in which at least a part of the living polymer is terminated by a hydrogen molecule.

It is noted from the results of Examples 7 to 9 that the production method of the present invention can be applied to the kind of the silane compound (II) in a wide Si/Ti ratio.

It is noted from the results of Examples 10 to 12 that the production method of the present invention is able to achieve a high hydrogenation rate in wide hydrogen pressure range and reaction temperature range.

Production Example 3

After purging the interior of a 3-L volume SUS316-made autoclave equipped with a thermometer, an electric heater, an electromagnetic induction stirrer, and a sampling port with a nitrogen gas, 2,070.0 g of cyclohexane and 0.774 g of a cyclohexane solution of 1.33 mmol/g of sec-butyllithium (1.030 mmol as sec-butyllithium) were added, and the temperature was raised to 50° C. over 30 minutes while stirring at 500 rpm. Subsequently, 30.5 g (292.89 mmol) of styrene was collectively added into the autoclave, the pressure was increased to 0.3 MPaG using a nitrogen gas, and the reaction was performed at a liquid temperature of 53±3° C. for one hour. Subsequently, 2.375 g of a cyclohexane solution of 13.87 mmol/g of tetrahydrofuran (32.936 mmol as tetrahydrofuran) was added into the autoclave, and 117.8 g (2,177.8 mmol) of butadiene was further added into the autoclave over 10 minutes. The pressure was increased to 0.4 MPaG using a nitrogen gas, and the reaction was performed at a liquid temperature of 53±3° C. for 3 hours. Subsequently, 30.5 g (292.89 mmol) of styrene was collectively added, the pressure was increased to 0.5 MPaG using a nitrogen gas, and the reaction was performed at a liquid temperature of 53±3° C. for 1.5 hours, thereby obtaining a reaction mixed liquid containing a living polymer.

After decreasing the pressure of the nitrogen gas into the reaction mixed liquid to 0.1 MPaG, the pressure was increased to 1.0 MPaG using a hydrogen gas, and the contents were treated at a liquid temperature of 53±3° C. for one hour, thereby obtaining 1,794.5 g of a solution containing Polymer C (hereinafter referred to as "Polymer Solution C"). In view of the fact that the content of the Polymer C was 178.8 g, the Polymer C concentration in the Polymer Solution C was 9.97% by mass, the lithium atom concentration was 0.5741 mmol/kg from the use amount of sec-butyllithium, and the butadiene unit content in the Polymer C was 65.9% by mass from the use amounts of butadiene and styrene.

The GPC analysis and $^1$H-NMR analysis of the Polymer C were performed in the same manners as in Production Example 1. As a result, the weight average molecular weight was 268,500; the molecular weight distribution was 1.059; and from area values of a peak 64.8 to 5.1 ppm capable of being assigned to the 1,2-bond unit of butadiene and a peak 85.2 to 5.5 ppm capable of being assigned to the 1,4-bond unit of butadiene, the degree of vinylation of the Polymer C was 35.2%.

Example 13

The same operations as in Example 1 were followed, except that in Example 1, 750 g of the Polymer Solution C (containing 74.775 g of the Polymer C) was used in place of 750 g of the Polymer Solution A (containing 73.866 g of the Polymer A). The hydrogenation rate is shown in Table 3.

Production Example 4

After purging the interior of a 3-L volume SUS316-made autoclave equipped with a thermometer, an electric heater, an electromagnetic induction stirrer, and a sampling port with a nitrogen gas, 2,070.0 g of cyclohexane and 0.762 g of a cyclohexane solution of 1.33 mmol/g of sec-butyllithium (1.014 mmol as sec-butyllithium) were added, and the temperature was raised to 50° C. over 30 minutes while stirring at 500 rpm. Subsequently, 60.42 g (580.16 mmol) of styrene was collectively added into the autoclave, the pressure was increased to 0.3 MPaG using a nitrogen gas, and the reaction was performed at a liquid temperature of 53±3° C. for 2 hours. Subsequently, 1.531 g of a cyclohexane solution of 0.29 mmol/g of N,N,N',N'-tetramethylethylenediamine (0.444 mmol as N,N,N',N'-tetramethylethylenediamine) was added into the autoclave, and 117.8 g (2,177.8 mmol) of butadiene was further added into the autoclave over 10 minutes. The pressure was increased to 0.4 MPaG using a nitrogen gas, and the reaction was performed at a liquid temperature of 53±3° C. for 3 hours. The pressure was increased to 0.5 MPaG using a nitrogen gas, and the reaction was performed at a liquid temperature of 53±3° C. for 1.5 hours, thereby obtaining a reaction mixed liquid containing a living polymer.

After decreasing the pressure of the nitrogen gas into the reaction mixed liquid to 0.1 MPaG, the pressure was increased to 1.0 MPaG using a hydrogen gas, and the contents were treated at a liquid temperature of 53±3° C. for one hour, thereby obtaining 1,793.1 g of a solution containing Polymer D (hereinafter referred to as "Polymer Solution D"). In view of the fact that the content of the Polymer D was 178.2 g, the Polymer D concentration in the Polymer Solution D was 9.94% by mass, the lithium atom concentration was 0.5654 mmol/kg from the use amount of sec-butyllithium, and the butadiene unit content in the Polymer D was 66.1% by mass from the use amounts of butadiene and styrene.

The GPC analysis and $^1$H-NMR analysis of the Polymer D were performed in the same manners as in Production Example 1. As a result, the weight average molecular weight was 298,300; the molecular weight distribution was 1.057; and from area values of a peak 84.8 to 5.1 ppm capable of being assigned to the 1,2-bond unit of butadiene and a peak 85.2 to 5.5 ppm capable of being assigned to the 1,4-bond unit of butadiene, the degree of vinylation of the Polymer D was 37.4%.

Example 14

The same operations as in Example 1 were followed, except that in Example 1, 750 g of the Polymer Solution D (containing 74.550 g of the Polymer D) was used in place of 750 g of the Polymer Solution A (containing 73.866 g of the Polymer A). The hydrogenation rate is shown in Table 3.

Production Example 5

After purging the interior of a 3-L volume SUS316-made autoclave equipped with a thermometer, an electric heater, an electromagnetic induction stirrer, and a sampling port with a nitrogen gas, 2,070.0 g of cyclohexane and 3.005 g of a cyclohexane solution of 1.33 mmol/g of sec-butyllithium (3.996 mmol as sec-butyllithium) were added, and the temperature was raised to 50° C. over 30 minutes while stirring at 500 rpm. Subsequently, 30.5 g (292.89 mmol) of styrene was collectively added into the autoclave, the pressure was increased to 0.3 MPaG using a nitrogen gas, and the reaction was performed at a liquid temperature of 53±3° C. for one hour. 117.8 g (2,177.8 mmol) of butadiene was further added into the autoclave over 10 minutes. The pressure was increased to 0.4 MPaG using a nitrogen gas, and the reaction was performed at a liquid temperature of 53±3° C. for 3 hours. Subsequently, 30.5 g (292.89 mmol) of styrene was collectively added, the pressure was increased to 0.5 MPaG using a nitrogen gas, and the reaction was performed at a liquid temperature of 53±3° C. for 1.5 hours, thereby obtaining a reaction mixed liquid containing a living polymer.

After decreasing the pressure of the nitrogen gas into the reaction mixed liquid to 0.1 MPaG, the pressure was increased to 1.0 MPaG using a hydrogen gas, and the contents were treated at a liquid temperature of 53±3° C. for one hour, thereby obtaining 1,794.3 g of a solution containing Polymer E (hereinafter referred to as "Polymer Solution E"). In view of the fact that the content of the Polymer E was 178.8 g, the Polymer E concentration in the Polymer Solution E was 9.96% by mass, the lithium atom concentration was 2.227 mmol/kg from the use amount of sec-butyllithium, and the butadiene unit content in the Polymer E was 65.9% by mass from the use amounts of butadiene and styrene.

The GPC analysis and $^1$H-NMR analysis of the Polymer E were performed in the same manners as in Production Example 1. As a result, the weight average molecular weight was 75,700; the molecular weight distribution was 1.027; and from area values of a peak 64.8 to 5.1 ppm capable of being assigned to the 1,2-bond unit of butadiene and a peak 65.2 to 5.5 ppm capable of being assigned to the 1,4-bond unit of butadiene, the degree of vinylation of the Polymer E was 7.7%.

Example 15

The same operations as in Example 1 were followed, except that in Example 1, 750 g of the Polymer Solution E (containing 74.700 g of the Polymer E) was used in place of 750 g of the Polymer Solution A (containing 73.866 g of the Polymer A). The hydrogenation rate is shown in Table 3.

Production Example 6

After purging the interior of a 3-L volume SUS316-made autoclave equipped with a thermometer, an electric heater, an electromagnetic induction stirrer, and a sampling port with a nitrogen gas, 2,070.0 g of cyclohexane and 0.784 g of a cyclohexane solution of 1.33 mmol/g of sec-butyllithium (1.043 mmol as sec-butyllithium) were added, and the temperature was raised to 50° C. over 30 minutes while stirring at 500 rpm. Subsequently, 30.1 g (297.53 mmol) of styrene was collectively added into the autoclave, the pressure was increased to 0.3 MPaG using a nitrogen gas, and the reaction was performed at a liquid temperature of 53±3° C. for one hour. Thereafter, the liquid temperature was raised to 80±3° C. over 10 minutes, and subsequently, a mixture of 80.7 g (1,491.6 mmol) of butadiene and 39.5 g (580.0 mmol) of isoprene was further added into the autoclave over 10 minutes. The pressure was increased to 0.4 MPaG using a nitrogen gas, and the reaction was performed at a liquid temperature of 80±3° C. for 2 hours. Subsequently, 31.0 g (297.05 mmol) of styrene was collectively added, the pressure was increased to 0.5 MPaG using a nitrogen gas, and the reaction was performed at a liquid temperature of 80±3° C. for 1.5 hours, thereby obtaining a reaction mixed liquid containing a living polymer.

After decreasing the pressure of the nitrogen gas into the reaction mixed liquid to 0.1 MPaG, the pressure was increased to 1.0 MPaG using a hydrogen gas, and the contents were treated at a liquid temperature of 80±3° C. for one hour, thereby obtaining 1,818.8 g of a solution containing Polymer F (hereinafter referred to as "Polymer Solution F"). In view of the fact that the content of the Polymer F was 182.1 g, the Polymer F concentration in the Polymer Solution F was 10.91% by mass, the lithium atom concentration was 0.5372 mmol/kg from the use amount of sec-butyllithium, the butadiene unit content in the Polymer F was 40.91% by mass, and the isoprene content in the Polymer F was 24.35% by mass.

The GPC analysis and $^1$H-NMR analysis of the Polymer F were performed in the same manners as in Production Example 1. As a result, the weight average molecular weight was 338,900; the molecular weight distribution was 1.085; and from area values of a peak 85.5 to 5.4 ppm capable of being assigned to the 1,2-bond unit of butadiene, a peak 65.2 to 5.5 ppm capable of being assigned to the 1,4-bond unit of butadiene, a peak 85.7 to 6.0 ppm capable of being assigned to the 1,2-bond unit of isoprene, a peak 64.5 to 4.8 ppm capable of being assigned to the 3,4-bond unit of isoprene, and a peak 65.0 to 5.2 ppm capable of being assigned to the 1,4-bond unit of isoprene, the degree of vinylation of the Polymer F was 8.1%.

Example 16

The same operations as in Example 1 were followed, except that 750 g of the Polymer Solution F (containing 75.075 g of the Polymer F) was used in place of 750 g of the Polymer Solution A (containing 73.866 g of the Polymer A); 8.019 g of a solution obtained by diluting the Catalyst Liquid A with cyclohexane to an extent of 0.0139 mmol/g as a titanium atom (0.1111 mmol as the titanium atom) was used in place of 15.950 g of the Diluted Liquid of Catalyst Liquid A; a solution obtained by diluting the Polymethylhydrosiloxane 1 with cyclohexane to an extent of 16.631 mmol/g as a silicon atom content was used in an amount of 1.676 g (containing 27.874 mmol as the silicon atom) in place of 15.684 g of the Silane Compound Diluted Liquid 1; the temperature was changed to 10±5° C.; and the pressure was changed to 3.0 MPaG.

Here, in the reaction system immediately after supplying the Catalyst Liquid A, 75.075 g of the Polymer F was existent, and 825.4 mmol of the carbon-carbon double bonds based on the butadiene and isoprene units, 0.424 mmol of the lithium atom, 0.0139 mmol of the titanium atom, 0.0135 mmol of the aluminum atom, and 16.631 mmol of the silicon atom were existent. That is, the use amount of the titanium atom per 1 mol of the carbon-carbon double bond based on the conjugated diene units (a total amount of the butadiene unit and the isoprene unit) was 0.1347 mmol; the use amount of the titanium atom relative to the Polymer F was 71.8 ppm; the Li/Ti ratio was 3.82; the Al/Ti ratio was 0.97; and the Si/Ti ratio was 250.8. The hydrogenation rate is shown in Table 3.

TABLE 3

|  |  | Example 1 | Example 13 | Example 14 | Example 15 | Example 16 |
|---|---|---|---|---|---|---|
| Polymer solution |  | A | C | D | E | F |
| Mw |  | 303,100 | 268,500 | 298,300 | 75,700 | 338,900 |
| Mw/Mn |  | 1.06 | 1.06 | 1.06 | 1.03 | 1.09 |
| St content (wt %) |  | 33.7 | 34.1 | 33.9 | 34.1 | 34.7 |
| BD content (wt %) |  | 66.3 | 65.9 | 66.1 | 65.9 | 40.9 |
| IP content (wt %) |  | — | — | — | — | 24.4 |
| Degree of vinylation (%) |  | 38.5 | 35.2 | 37.4 | 7.7 | 8.07 |
| Temperature (° C.) |  | 75 | 75 | 75 | 75 | 100 |
| Pressure (MPaG) |  | 1.0 | 1.0 | 1.0 | 1.0 | 3.0 |
| Ti content (ppm) |  | 3.0 | 3.0 | 3.0 | 3.0 | 71.8 |
| Li/Ti ratio |  | 90.9 | 91.7 | 91.0 | 358.1 | 3.82 |
| Al/Ti ratio |  | 0.97 | 0.97 | 0.97 | 0.97 | 0.97 |
| Si/Ti ratio |  | 252.5 | 252.5 | 252.5 | 252.5 | 250.8 |
| Hydrogenation rate (%) | 15 min | 8.3 | 9.26 | 4.6 | 80.5 | 71.2 |
|  | 30 min | 17.7 | 17.2 | 10.0 | 88.7 | 79.1 |
|  | 1 hr | 40.9 | 35.1 | 21.7 | 96.7 | 90.7 |
|  | 2 hr | 97.0 | 95.5 | 52.9 | 99.0 | 95.7 |
|  | 4 hr | 99.3 | 98.8 | 96.2 | — | 97.0 |
|  | 6 hr | — | — | 98.1 | — | — |

St: Styrene,
DB: butadiene,
IP: isoprene

It is noted from the results of Examples 1, 13, and 15 that on the occasion of producing a polymer, for the purpose of controlling the bonding mode of the conjugated diene, in the case of making or not making a Lewis base coexistent and furthermore, in various polymer solutions in which the kind of the Lewis base is changed, a high hydrogenation rate can be achieved.

It is noted from the results of Examples 14 to 16 that even in the case of using a polymer of every sort containing a conjugated diene unit, a high hydrogenation degree can be achieved.

INDUSTRIAL APPLICABILITY

In accordance with the present invention, in view of the fact that on the occasion of using the Tebbe-type metallacycle compound as the hydrogenation catalyst and selectively hydrogenating the carbon-carbon double bond based on the conjugated diene structural unit of the conjugated diene-based polymer to produce a hydrogenated polymer, a high hydrogenation rate can be achieved by a small use amount therein at a level of not requiring a decalcification process of the catalyst, a hydrogenated polymer can be industrially advantageously produced. The hydrogenation catalyst system that is used in the production method of the present invention is extremely high in activity.

The invention claimed is:
1. A method for producing a hydrogenated polymer, the method comprising:
hydrogenating, with a hydrogen molecule, a carbon-carbon double bond based on a conjugated diene structural unit of a polymer in which at least a part of a living polymer obtained by polymerizing a monomer comprising one or more conjugated dienes using an organic alkali metal compound as a polymerization initiator is terminated by a hydrogen molecule, by using an organic metal compound of the following formula (I) as a catalyst component, and making a silane compound coexistent:

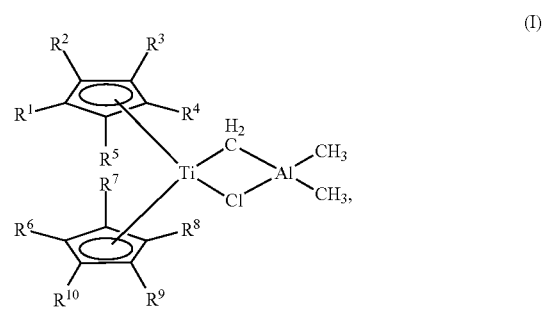

(I)

wherein $R^1$ to $R^{10}$ each is a hydrogen atom;

wherein an amount of the organic metal compound is from $1.0 \times 10^{-4}$ to $1.0 \times 10^{-1}$ mmol in terms of a titanium atom of the organic metal compound per 1 mol of the carbon-carbon double bond based on the conjugated diene structural unit contained in the polymer;

wherein the silane compound has at least one silyl hydride bond and is at least one selected from the group consisting of a silyl hydride compound of the following formula (II-1), a silyl hydride polymer compound of the following formula (II-2), and a cyclic silyl hydride compound of the following formula (II-3):

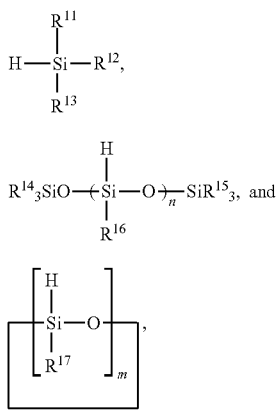

wherein $R^{11}$, $R^{12}$, $R^{13}$, $R^{14}$, $R^{15}$, $R^{16}$, and $R^{17}$ each independently is a hydrogen atom, a halogen atom, an alkyl group, an aryl group, an aralkyl group, a cycloalkyl group, an alkoxy group, an aryloxy group, an aralkyloxy group, an acyloxy group, or a carboxyl group; n is a positive integer of 0 or more; and m is an integer of 2 to 5; and wherein an amount of the silane compound is from 1 to 504.9 in terms of a molar number of the silicon atom constituting the silyl hydride bond per 1 mol of a titanium atom of the organic metal compound, and further comprising, prior to the hydrogenating, reacting a titanocene dichloride of the following formula (III):

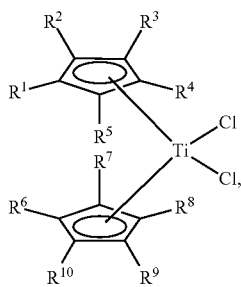

wherein $R^1$ to $R^{10}$ each is a hydrogen atom, with trimethylaluminum in an organic solvent for 24 to 100 hours, in the absence of silyl hydride, thereby producing the organic metal compound of the formula (I), and introducing a solution of the silane compound (II) and then a solution of the organic metal compound (I) to conduct the hydrogenating.

2. The method according to claim 1, wherein the silane compound is at least one compound selected from the group consisting of methyldichlorosilane, ethyldichlorosilane, propyldichlorosilane, butyldichlorosilane, pentyldichlorosilane, hexyldichlorosilane, heptyldichlorosilane, octyldichlorosilane, nonyldichlorosilane, decyldichlorosilane, phenyldichlorosilane, dimethylchlorosilane, diethylchlorosilane, dipropylchlorosilane, dibutylchlorosilane, dipentylchlorosilane, dihexylchlorosilane, diheptylchlorosilane, dioctylchlorosilane, dinonylchlorosilane, didecylchlorosilane, methylpropylchlorosilane, methylhexylchlorosilane, methylphenylchlorosilane, polymethylhydrosiloxane, polyethylhydrosiloxane, polypropylhydrosiloxane, polybutylhydrosiloxane, polypentylhydrosiloxane, polyhexylhydrosiloxane, polyheptylhydrosiloxane, polyoctylhydrosiloxane, polynonylhydrosiloxane, polydecylhydrosiloxane, polyphenylhydrosiloxane, and 1,1,3,3-tetramethyldisiloxane.

3. The method according to claim 1, wherein the living polymer is at least one selected from the group consisting of S—B—Li, S—B—S—Li, S—B—S—B—Li, B—S—Li, B—S—B—Li, and B—S—B—S—Li, each having a conjugated diene block B constituted of one or more conjugated dienes and a vinyl aromatic compound block S constituted of one or more vinyl aromatic compounds; a block copolymer in which at least a part of the living polymer is terminated by a hydrogen molecule has a weight average molecular weight of 5,000 to 1,000,000 and a molecular weight distribution of 1.00 to 3.00 as expressed in terms of standard polystyrene measured by gel permeation chromatography; and a content of the structural unit derived from the conjugated diene in the block copolymer is 10 to 90% by mass.

4. The method according to claim 3, wherein the conjugated diene block B of the living polymer comprises at least one of butadiene or isoprene, and the vinyl aromatic compound block S comprises at least styrene; a polymer in which at least a part of the living polymer is terminated by a hydrogen molecule has a weight average molecular weight of 50,000 to 500,000 and a molecular weight distribution of 1.00 to 1.25 as expressed in terms of standard polystyrene measured by gel permeation chromatography; and a content of the structural unit derived from the conjugated diene in the block copolymer is 30 to 70% by mass.

5. The method according to claim 3, wherein the conjugated diene block B is constituted of butadiene, isoprene, or a mixture thereof, and the vinyl aromatic compound block S is constituted of styrene.

6. The method according to claim 1, wherein the amount of the organic metal compound of the formula (I) is from $1.0 \times 10^{-3}$ to $1.0 \times 10^{-2}$ mmol in terms of a titanium atom of the organic metal compound of the formula (I) per 1 mol of the carbon-carbon double bond based on the conjugated diene structural unit contained in the polymer.

7. The method according to claim 1, wherein the amount of the silane compound is from 128.1 to 504.9 mol in terms of a molar number of the silicon atom constituting the silyl hydride bond per 1 mol of a titanium atom of the organic metal compound.

8. The method according to claim 1, wherein a hydrogenation rate of the carbon-carbon double bond based on the conjugated diene structural unit of the polymer is 95% or more.

9. The method according to claim 1, wherein the silane compound is a promoter.

* * * * *